United States Patent
Price et al.

(10) Patent No.: US 10,362,296 B2
(45) Date of Patent: Jul. 23, 2019

(54) LOCALIZED DEPTH MAP GENERATION

(71) Applicant: MICROSOFT TECHNOLOGY LICENSING, LLC, Redmond, WA (US)

(72) Inventors: Raymond Kirk Price, Redmond, WA (US); Michael Bleyer, Seattle, WA (US); Denis Claude Pierre Demandolx, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 9 days.

(21) Appl. No.: 15/680,188

(22) Filed: Aug. 17, 2017

(65) Prior Publication Data
US 2019/0058859 A1 Feb. 21, 2019

(51) Int. Cl.
G06T 7/521 (2017.01)
H04N 13/271 (2018.01)
(Continued)

(52) U.S. Cl.
CPC .......... *H04N 13/271* (2018.05); *G06T 7/521* (2017.01); *G06T 7/55* (2017.01); *H04N 13/111* (2018.05);
(Continued)

(58) Field of Classification Search
CPC .. H04N 13/271; H04N 13/344; H04N 13/111; H04N 13/282; H04N 13/139;
(Continued)

(56) References Cited

U.S. PATENT DOCUMENTS 7,606,417 B2 10/2009 Steinberg et al.
8,155,405 B2 4/2012 Unal et al.
(Continued)

FOREIGN PATENT DOCUMENTS

EP 2466901 A2 6/2012
WO 2014154839 A1 10/2014
(Continued)

OTHER PUBLICATIONS

Okuma et al, An augmented reality system using a real time vision based registration (Year: 2000).*
(Continued)

*Primary Examiner* — Shan E Elahi
(74) *Attorney, Agent, or Firm* — NovoTechIP International PLLC

(57) ABSTRACT

Techniques involving localized depth map generation, the techniques including receiving pixel data for a frame captured by an image sensor, the pixel data including at least one light intensity value, corresponding to an amount of light received by the image sensor during a frame period, for each of a plurality of pixels; identifying a subset of the pixels as being associated with a physical object detected based on at least the pixel data; selecting a region of the frame, the region corresponding to at least the subset of the pixels; and selectively generating a localized depth map for the frame period corresponding to the selected region. A portion of the frame outside of the selected region is not associated with a depth map generated for the frame period.

20 Claims, 10 Drawing Sheets

(51) Int. Cl.

| | | |
|---|---|---|
| *H04N 13/111* | (2018.01) | |
| *H04N 13/139* | (2018.01) | |
| *H04N 13/282* | (2018.01) | |
| *H04N 13/344* | (2018.01) | |
| *G06T 7/55* | (2017.01) | |
| *G06F 3/01* | (2006.01) | |
| *H04N 13/00* | (2018.01) | |

(52) U.S. Cl.
CPC ......... *H04N 13/139* (2018.05); *H04N 13/282* (2018.05); *H04N 13/344* (2018.05); *G06F 3/017* (2013.01); *G06T 2207/10012* (2013.01); *G06T 2207/10028* (2013.01); *G06T 2207/20008* (2013.01); *G06T 2207/30196* (2013.01); *H04N 2013/0081* (2013.01)

(58) Field of Classification Search
CPC ............ H04N 2013/0081; G06T 7/521; G06T 2207/10028; G06T 2207/30196; G06F 3/017
USPC .......................................................... 348/43
See application file for complete search history.

(56) References Cited

U.S. PATENT DOCUMENTS

| | | | |
|---|---|---|---|
| 8,422,769 B2 | 4/2013 | Rother et al. | |
| 8,467,588 B2 | 6/2013 | Long et al. | |
| 8,498,481 B2 | 7/2013 | Blake et al. | |
| 8,644,609 B2 | 2/2014 | Rother et al. | |
| 8,994,652 B2 | 3/2015 | Fleischmann et al. | |
| 2008/0094351 A1* | 4/2008 | Nogami .................. | G06F 3/016 345/156 |
| 2012/0308116 A1 | 12/2012 | Eichorn | |
| 2013/0129227 A1 | 5/2013 | Mathe et al. | |
| 2014/0184496 A1* | 7/2014 | Gribetz ................ | G02B 27/017 345/156 |
| 2015/0193657 A1 | 7/2015 | Gurman | |
| 2015/0206313 A1 | 7/2015 | Reif et al. | |
| 2015/0241330 A1* | 8/2015 | Knox ..................... | G01N 15/06 356/338 |
| 2015/0253428 A1* | 9/2015 | Holz ....................... | G01S 17/42 356/5.01 |
| 2015/0287215 A1 | 10/2015 | Ohba et al. | |
| 2016/0151599 A1* | 6/2016 | Korneff ................ | A61M 11/005 128/203.25 |
| 2016/0260261 A1* | 9/2016 | Hsu ........................ | G06T 19/006 |
| 2016/0300091 A1* | 10/2016 | Cumoli ............. | G06K 7/10722 |
| 2017/0357858 A1* | 12/2017 | Mendonca ......... | G06K 9/00664 |
| 2018/0143693 A1* | 5/2018 | Calabrese ............... | G06F 3/017 |

FOREIGN PATENT DOCUMENTS

| | | |
|---|---|---|
| WO | 2016092533 A1 | 6/2016 |
| WO | 2016174858 A1 | 11/2016 |

OTHER PUBLICATIONS

Makibuchi et al, Vision based robust calibration for optical see through head mounted displays (Year: 2013).*

Kim, et al., "Accurate Localization of 3D Objects from RGB-D Data using Segmentation Hypotheses", In Proceedings of the IEEE Conference on Computer Vision and Pattern Recognition, Jun. 23, 2013, pp. 1-8.

Lempitsky, et al., "Image Segmentation with a Bounding Box Prior", In Proceedings of IEEE 12th International Conference on Computer Vision, Sep. 29, 2009, 11 pages.

Mishra, et al., "Segmenting 'Simple' Objects Using RGB-D", In Proceedings of IEEE International Conference on Robotics and Automation, May 14, 2012, 8 pages.

Castaneda, et al., "Time-of-Flight and Kinect Imaging", Retrieved From: http://campar.in.tum.de/twiki/pub/Chair/TeachingSs11Kinect/2011-DSensors_LabCourse_Kinect.pdf, Jun. 2011, 53 Pages.

"International Search Report and Written Opinion Issued in PCT Application No. PCT/US2018/038688", dated Sep. 7, 2018, 12 Pages.

* cited by examiner

LOCALIZED DEPTH MAP GENERATION

BACKGROUND

A number of systems include and employ depth sensing devices, such as time-of-flight (ToF) cameras, for tracking hands (for hand gesture recognition and input) or other objects. Such tracking is useful in applications with real-time processing demands such as robotics, vehicle guidance, and providing low latency gesture-based input, and for virtual reality (VR), augmented reality (AR), and mixed reality (MR) applications where low latency depth computation is desirable and yields improved performance and/or an improved user experience (for example, by reducing latency between user motion and displaying graphical elements to a user that correspond to tracked objects). For many such applications, depth sensing devices that cover a wide field of view (for example, greater than 120 degrees), offer high angular resolution (permitting more detailed modeling of a tracked object), and also operate with a high frame rate (for example, 60 frames per second or more) are preferred. However, ever-increasing resolutions and frame rates for depth sensing devices comes at a cost of increased amounts of camera data and shortened real-time deadlines for processing each frame of camera data.

SUMMARY

Devices employing depth sensing are disclosed. The device can include a first image sensor configured to measure received amounts of light, and an object detector configured to receive first pixel data for a first frame captured by the first image sensor, the first pixel data including at least one light intensity value, corresponding to an amount of light received by the first image sensor during a first frame period, for each of a plurality of first pixels, and identify a first subset of the first pixels as being associated with a first physical object detected based on at least the first pixel data. The device may also include a region of interest selection module configured to select a first region of the first frame, the first region corresponding to at least the first subset of the first pixels identified by the object detector, and a depth map calculation module configured to selectively generate a localized depth map for the first frame period corresponding to the first region selected by the region of interest selection module. A portion of the first frame outside of the first region is not associated with a depth map generated for the first frame period.

In another aspect, devices employing depth sensing are disclosed. The device can include a first image sensor and a second image sensor arranged for stereoscopic depth estimation and each configured to measure received amounts of light, and an object detector configured to receive first pixel data for a first frame captured by the first image sensor, the first pixel data including at least one light intensity value, corresponding to an amount of light received by the first image sensor during a first frame period, for each of a plurality of first pixels, identify a first subset of the first pixels as being associated with a first physical object detected based on at least the first pixel data, receive second pixel data for a second frame captured by the second image sensor, the second pixel data including at least one light intensity value, corresponding to an amount of light received by the second image sensor during a second frame period overlapping the first frame period, for each of a plurality of second pixels, and identify a second subset of the second pixels as being associated with the first physical object detected based on at least the second pixel data. The device may also include a region of interest selection module configured to select a first region of the first frame, the first region corresponding to at least the first subset of the first pixels identified by the object detector, and select a second region of the second frame, the second region corresponding to at least the second subset of the second pixels identified by the object detector, and a depth map calculation module configured to perform stereo matching of pixels selected as corresponding to the first region of the first frame and pixels selected as corresponding to the second region of the second frame to generate a localized depth map corresponding to the first and second regions selected by the region of interest selection module. A portion of the first frame outside of the first region is not associated with a depth map generated for the first frame period, and a portion of the second frame outside of the second region is not associated with a depth map generated for the first or second frame periods.

In another aspect, methods for localized depth map generation are disclosed. The method may include receiving first pixel data for a first frame captured by a first image sensor, the first pixel data including at least one light intensity value, corresponding to an amount of light received by the first image sensor during a first frame period, for each of a plurality of first pixels, and identifying a first subset of the first pixels as being associated with a first physical object detected based on at least the first pixel data. The method may also include selecting a first region of the first frame, the first region corresponding to at least the first subset of the first pixels identified as being associated with the first physical object, and selectively generating a localized depth map for the first frame period corresponding to the selected first region. A portion of the first frame outside of the first region is not associated with a depth map generated for the first frame period.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
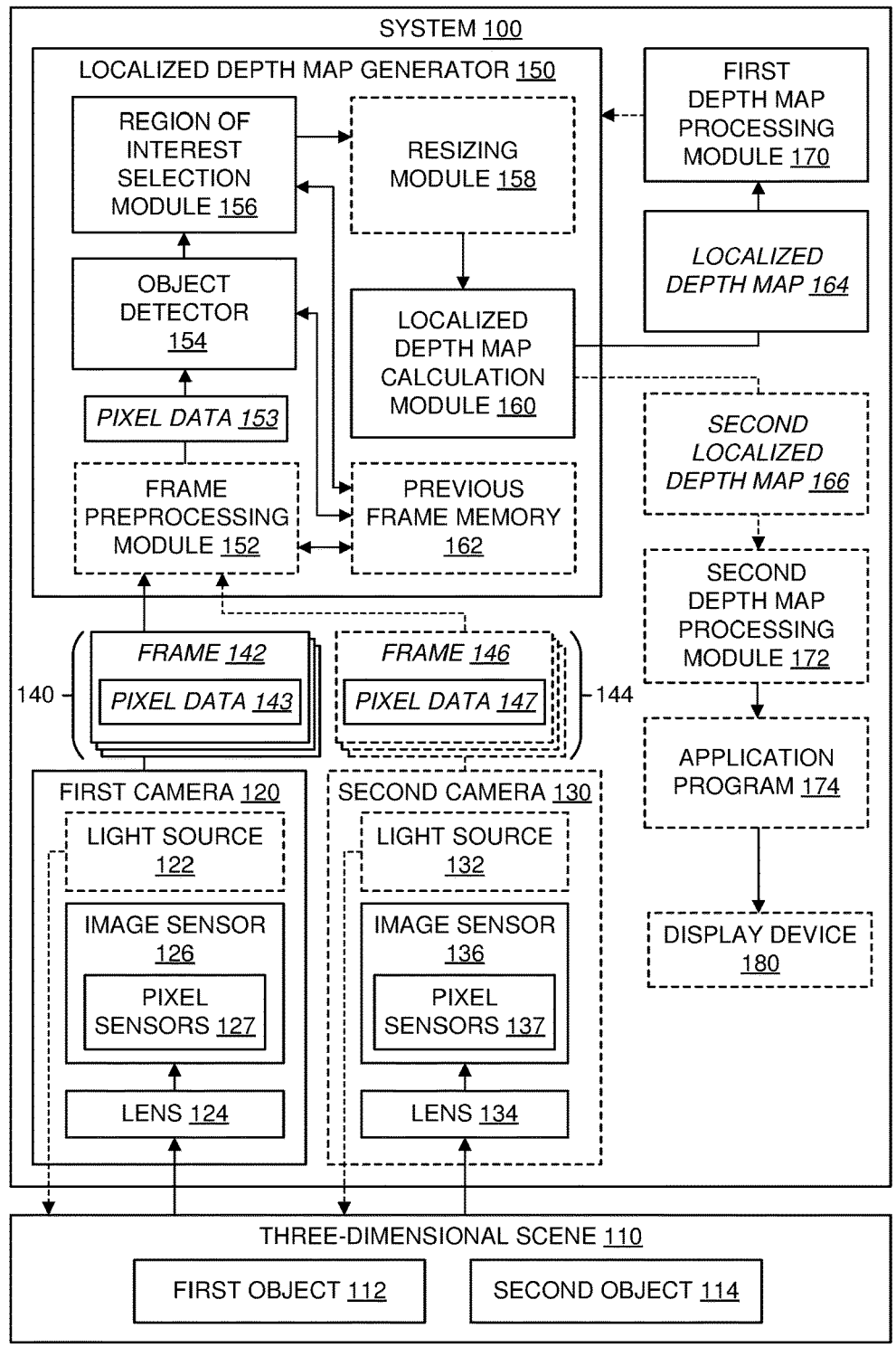
FIG. 1 is a schematic diagram illustrating features included in an example system arranged to generate localized depth maps.

FIG. 1 is a schematic diagram illustrating features included in an example system 100 arranged to generate localized depth maps. The system 100 includes a first camera 120 configured to measure amounts of light received from a three-dimensional (3-D) scene 110. The 3-D scene 110 may also be referred to as a "real world scene," as a "current environment" of system 100 or a user of system 100, or simply as a "scene." In the example illustrated in FIG. 1, the scene 110 includes a first physical object 112 and a second physical object 114. Although two physical objects 112 and 114 are illustrated in the example of FIG. 1, the scene 110 may include a greater or smaller number of physical objects. Examples of physical objects 112 and 114 include, but are not limited to, hands, heads, faces, people, animals, and vehicles. In some examples, there may be types of physical objects that are of interest for low latency tracking by the system 100; for example, light intensity data corresponding to a user's hands may be of interest for performing hand gesture recognition to allow interaction with the system 100 via hand gestures.

In some implementations, the first camera 120 may include a light source 122 configured to emit light to the 3-D scene 110 that is reflected by surfaces in the scene 110, including, for example, surfaces of the first physical object 112 and/or the second physical object 114. The first camera 120 includes a lens 124 that is configured to focus light received from portions of scene 110 (for example, reflected light initially emitted by the light source 122) within a field of view (FOV) of the first camera 110 (which corresponds to an FOV of an image sensor 126 included in the first camera 110) onto the image sensor 126. The image sensor 126 includes a plurality of pixel sensors 127 each arranged to measure a received light intensity or intensities (or amount(s) of light received) for a respective portion of the FOV of the first camera 110 (this portion of the FOV of the first camera 110 may be referred to as the FOV of the pixel sensor) during an integration, measurement, exposure, or capture period. Where a portion of the FOV for a pixel sensor is directed at a portion of a physical object, it measures an amount light received from that portion of the physical object. Physical objects in scene 110 may enter, move about, and exit the FOV of the first camera 120 over time, due to movement of the system 100 or first camera 120 and/or movement of the physical objects through the scene 110. In some implementations, a pixel sensor may include multiple subpixel sensors; for example, a pixel of an RGB color camera may include a red subpixel sensor, a green subpixel sensor, and a blue subpixel sensor. The pixel sensors 127 may be arranged in an array or grid in rows and columns; for example, in an array of 1268×720 pixel sensors or an array of 1920×1080 pixel sensors.

The first camera 120 is configured to provide light intensity data in frames 140, such as a current frame 142 (with may be referred to as a "first frame 142"). Frame 142 may also be referred to as "frame data." Each of the frames 140 is for a respective frame period, having a start time and end time, and includes pixel data (such as pixel data 143 included in frame 142) that includes at least one light intensity value, corresponding to an amount of light measured by one of pixel sensors 127 during the frame period, for each of a plurality of pixels corresponding to the pixel sensors 127. The light intensity values may also be referred to as "pixel intensity values." In some examples, such as an RGB color camera with red, green, and blue subpixel sensors, pixel data 143 includes multiple light intensity values for each pixel, with at least one pixel intensity value for each subpixel sensor. In some examples, such as some ToF cameras, the first camera 120 may perform multiple exposures during each frame period, with pixel data 143 including, for each pixel, at least one light intensity value for each exposure.

As illustrated in FIG. 1, the first camera 120 is in electronic communication with the localized depth map generator 150. Specifically, frames 140 provided by the first camera 120 are received and processed by the localized depth map generator 150. The first camera 120 may also receive data such as commands or instructions from the localized depth map generator 150 or other elements of the system 100. For example, the localized depth map generator 150 may specify a frame rate at which the first camera 120 is to produce successive frames 140. As another example, the localized depth map generator 150 may issue frame capture commands to the first camera 120 for individual frames, in response to which the first camera 120 performs light intensity measurements for a new frame.

In some implementations, the system 100 also includes a second camera 130 configured to measure amounts of light received from the scene 110. The second camera 130 may include a light source 132, and includes a lens 134 and image sensor 136. The second camera 130 is configured to provide light intensity data in frames 144, including a current frame 146 (which may be referred to as a "second frame 146"). The foregoing descriptions of the first camera 120, light source 122, lens 124, image sensor 126, pixel sensors 127, and frames 140 (including frame 142 and pixel data 143) apply to the second camera 130, light source 132, lens 134, image sensor 136, pixel sensors 137, and frames 144 (including frame 146 and pixel data 147), respectively. Although an FOV of the second camera 130 may not be the same as the FOV of the first camera 120, the FOVs of the first and second cameras 120 and 130 are arranged to overlap. Much as with the first camera 120, the second camera 130 is in electronic communication with the localized depth map generator 150. The system 100 may be configured to synchronize frames captured by the first and second cameras 120 and 130. For example, current frames 142 and 146 may both be for the same frame period, or overlapping frame periods. In some implementations, the system 100 may include three or more cameras that produce frames used by the localized depth map generator 150.

There are various camera technologies suitable for the first and second cameras 120 and 130, including, but not limited, to the following examples. In some examples, an infrared (IR) camera may be used. Some IR cameras may perform active IR illumination of scene 110 using an IR light source. Some IR cameras may be configured to, for a single frame, capture a baseline image (without providing illumination) and an active image (providing IR illumination) for purposes of subtracting an ambient component from the active image; for such cameras, pixel data for the frame may include light intensity values for both the baseline image and the active image, or ambient-subtracted light intensity values calculated by the camera based on the baseline and active images. Although depth estimation may be performed using a single IR camera based on a distance squared reduction in brightness, stereoscopic approaches involving two IR cameras are typically more robust for depth estimation.

In some examples, a range gated ToF camera may be used, which is configured to capture multiple images for a single frame, each image indicating amounts of light reflected from scene 110 for multiple pulsed illuminations of the scene 110 (hundreds or thousands of illuminations may be performed for each image to aggregate reflected light). Each image is captured using a different shutter profile, with one or more portions of a returning light pulse being blocked or permitted by a high speed electronic shutter according to its time of arrival (which corresponds to a distance traveled by the light pulse). Pixel data for a frame provided by a range gated ToF camera may include light intensity values for each of the different shutter profiles. By way of example, for a range gated ToF camera using four shutter profiles, a frame provided by the camera may include, for each pixel in the frame, four light intensity values corresponding to the four shutter profiles. These light intensity values may be correlated or deconvolved to estimate a distance and brightness for each pixel.

In some examples, a phase-based, or continuous wave, ToF camera may be used, which is configured to illuminate scene 110 with an IR light source modulated with an RF carrier. For a single frame, multiple phase-based integrations (for example, at 0, 90, 180, and 270 degrees from the emitted modulated light, or as another example, at 0, 120, and 240 degrees from the emitted modulated light) of the modulated light reflected by scene 110 back to the camera are performed, and for each of the integrations a light intensity value may be provided for a pixel of a frame. In some examples, for a single frame, a succession of multiple exposures may be performed at different modulation frequencies, each involving multiple phase-based integrations, and for each of the integrations at each of the modulation frequencies a light intensity value may be provided for a pixel of a frame. By way of example, for a phase-based ToF camera using three modulation frequencies and four phase-based integrations (such as at 0, 90, 180 and 270 degrees from the emitted modulated light), a frame provided by the camera may include, for each pixel in the frame, twelve light intensity values corresponding to the phase-based integrations performed for each of the modulation frequencies. These light intensity values may be processed to estimate a distance and brightness for each pixel.

In some examples, a structured-light depth scanner may be used, which is configured to, for each frame, capture multiple images for a series of different light patterns. A frame provided by the scanner may include, for each pixel of the frame, a light intensity value for each of the multiple images. Displacements of the light patterns by the scene 110 may be used to estimate a distance for each pixel.

In some examples, a color camera, such as an RGB (red, blue, and green) color camera may be used. Advantages of including a color camera include, but are not limited to, maturity of color camera technologies relative to many other camera technologies, higher resolutions available for color cameras compared to other camera technologies, and the availability of light intensity values for multiple color components. However, whereas for the above-mentioned IR and ToF cameras a single frame may provide enough information to estimate distances to portions of the scene 110, a single frame from a color camera may not be well suited for depth estimation. Use of a color camera in combination with another camera may improve performance of object detection and/or depth estimation performed by localizing depth map generator 150.

There are various configurations involving two or more cameras. In some examples, two cameras of a same type, such as two IR cameras or two RGB color cameras, may be set a distance apart for stereoscopic imaging and depth estimation based on correlation of pixel data in two frames provided by the two cameras for a frame period. In some examples, different camera types may be used together, such as an RGB color camera in combination with an IR camera or a ToF camera. For example, color pixel data provided by a color camera may be used for object detection and localization, and pixel data from an IR camera or ToF camera may be used for depth estimation. In other examples, both a frame from a color camera and a frame from an IR camera or a ToF camera may be used for object detection and localization, such as based on brightness, color, or other boundaries. Where different types of cameras are used in such a manner, it may be useful to arrange lenses 122 and 132 in close proximity to reduce parallax.

The localized depth map generator 150 is configured to receive the frame 142 (and in some examples, receive frame 146 from the second camera 130) and generate a localized depth map for each instance of a physical object detected in frame 142. The term "localized depth map" refers to a depth map (such as localized depth maps 164 and 166 illustrated in FIG. 1) for an object instance that corresponds to, and is essentially limited to, a region of interest (ROI) selected by the region of interest selection module 156 for the object instance, in contrast to a "non-localized" depth map generated for frame 142 that corresponds to all or most of an FOV of the frame 142. Each localized depth map is localized to a region of the frame 142 in which the physical object is determined to appear in the frame 142. The localized depth map generator 150 is further configured to similarly process additional frames included in the frames 140 received from the first camera 120 (and in some examples, also process additional frames included in frames 144 received from the second camera 130). In some implementations, the localized depth map generator 150 may include a previous frame memory 162. The previous frame memory 162 is configured to store and provide data regarding one or more of frames 140 previously processed by the localized depth map generator 150, which may be used for processing the current frame 142. In some examples, frame preprocessing module 152, object detector 154, and/or region of interest selection module 156 may be configured to store data generated in processing the current frame 142 in previous frame memory 162 for use in processing later frames, and frame preprocessing module 152, object detector 154, and/or region of interest selection module 156 may be configured to obtain data from previous frame memory 162 for previously processed frames.

In some implementations, the localized depth map generator 150 includes a frame preprocessing module 152. The frame preprocessing module 152 is configured to perform initial processing of the pixel data 143 included in the frame 142 before performing object detection. The resulting preprocessed pixel data is provided as pixel data 153 to object detector 154. In some examples in which frame 142 is received from a ToF camera, the pixel data 143 may be preprocessed to determine an amplitude of the received light (where the amplitude excludes an ambient offset, it may be referred to as an "active brightness") for each pixel in the frame 142 (without also estimating distances, performing phase calculation, or dealiasing depth calculation for the pixels). The resulting amplitude data may be more effective for object detection. In some examples in which frame 142 is received from an IR camera that captures a baseline image (non-illuminated) and an active image, an ambient component may be removed to determine an active brightness signal for each pixel in the frame 142. With the resulting active brightness data, the object detector 154 can more effectively determine that a physical object is present in the frame and better distinguish foreground and background pixels for the object. In some examples, the pixel data 143 is downsampled to a smaller number of pixels. This may be useful for removing single-pixel noise and reducing an amount of processing performed by the object detector 154. In some examples, lowpass filtering (such as by applying a Gaussian or box filter), contrast enhancement, and/or histogram equalization may be performed on the pixel data 143. In some examples, one or more image transformations may be performed to correct for image distortions introduced by lens 124. In some examples, motion detection may be performed, based on data obtained from the previous frame memory 162 for one or more frames previously processed by the frames 140, to identify potential regions of interest from object detection. In some examples, the frame preprocessing module 152 is configured to perform similar initial processing of the frame 146. Where frames 142 and 146 have different image resolutions, frame 142 and/or frame 146 may be resized to more easily correlate positions in the two frames 142 and 146. In implementations not involving frame preprocessing module 152, pixel data 143 (or a portion of pixel data 143) may be provided as pixel data 153 to object detector 154.

It is noted that in some examples, even if pixel data 143 is not initially processed by frame preprocessing module 152, the pixel data 153 may have a different number of pixels than pixel data 143 and/or the pixels in pixel data 153 may have a different average angular resolution than the pixels in pixel data 143. In any event, pixel data 143 and pixel data 153 are both considered to be pixel data for the frame 142 (as well as for the frame period for the frame 142, which may be referred to as a "current frame period") produced by the first camera 120 for a frame period, with pixel data 153 also including at least one light intensity value, corresponding to an amount of light received from a portion of the FOV of the first camera 120 during the frame period, for each pixel included in the pixel data 153.

The object detector 154 is configured to receive the pixel data 153 for the frame 142 and to identify one or more subsets of the pixels included in the pixel data 153, each subset being associated with a respective physical object detected based on the pixel data 153. Each physical object detected based on the pixel data 153 may be referred to as an "object instance." Detection of an object instance may include classification of the object, in which one or more classes or types of physical objects are identified for the object instance. A detected object instance may have one or more object classifications with respective confidence scores that the object instance actually corresponds to a respective object class. The object detector 154 may be configured to use one or more threshold scores to determine whether a detected object instance will be processed as an object instance of a particular object class, based on whether a confidence score for the object class is greater than or equal to a respective threshold score. Separate threshold scores may be used for respective object classes or groups of object classes. One or more of the threshold scores may be dynamically set and/or changed according to various conditions detected by the system 100. For example, threshold scores for object classes associated with physical objects typically encountered in an outdoor environment (for example, motor vehicles) may be increased in response to the system 100 determining it is in an indoor environment. In some examples, pixel data 143 corresponding to light received from a single physical object may result in multiple object instances for different object classes, resulting in multiple localized depth maps being generated for a single physical object.

As mentioned above, the object detector 154 is configured to identify one or more subsets of the pixels included in the pixel data 153 for the frame 142, each subset being associated with a respective one of the object instances detected based on the pixel data 153. Such identification of a subset of pixels associated with a detected object instance may be referred to as "object localization." In some examples, an object localization for an object instance results in a rectangular bounding box that closely surrounds multiple pixels identified for the object instance. For a rectangular bounding box, the subset of pixels may be all of the pixels within the bounding box. With a rectangular bounding box, in addition to "foreground" pixels (pixels corresponding to light received from an identified object), a substantial fraction of the subset of pixels may be "background" pixels (pixels for other portions of scene 110). A bounding box may be specified, for example, with X and Y coordinates for one corner of the bounding box and a width and height of the bounding box. In some examples, an object localization may involve "object segmentation" resulting in pixel-level labeling of foreground pixels for a detected object instance (which may be referred to as an "object segment" or simply a "segment"), resulting in fewer background pixels being included in the identified subset of pixels in comparison to a rectangular bounding box. An object segmentation may be specified by a bitmap, such as a binary bitmap indicating whether or not individual pixels are included in the object segmentation.

Various techniques may be applied for object detection, localization, and/or segmentation. In some examples, at least one machine-trained model (such as, but not limited to, a model for a deep-structured convolutional neural network) trained to detect instances of one or more object classes may be applied for object detection, localization, and/or segmentation based on at least the pixel data 153 for the frame 142. In some examples, object detection, localization, and/or segmentation may be based on brightness, active brightness, and/or color boundaries detected in the pixel data 153. In some examples, object detection, localization, and/or segmentation may be based on grouping together adjacent pixels by texture, color, and/or intensity. In some examples, one or more graphical energy minimization techniques, such as, but not limited to the GrabCut method, may be used for object detection, localization, and/or segmentation. In some examples, different techniques may be applied for different object classes or groups of object classes.

In some examples, the object detector 154 may be configured to obtain data regarding one or more of frames 140 previously processed by the localized depth map generator 150 from previous frame memory 162 for processing the current frame 142. As a first example, one or more of the threshold scores described above may be dynamically set and/or changed based on data from previous frames. For example, if an object instance of an object class was recently detected in a previous frame, a threshold score for the object class may be temporarily reduced to reflect an increased likelihood of an object instance of the same object class being present in pixel data 153 for the current frame 142. As a second example, a first position identified for an object instance detected for a previous frame may be used to determine a possible location for the object instance in the pixel data 153 for the current frame 142. The possible location may be determined based on an estimated movement of the system 100 or first camera 120 (based on, for example, sensor data provided by motion sensors) an estimated movement of the object instance through the scene 110.

Further details and examples of operation of the object detector 154 will be illustrated and described in later figures.

The localized depth map generator 150 includes a region of interest identification module 156. The region of interest identification module 156 is configured to select a respective region of the current frame 142 (or an FOV of the frame 142) corresponding to each subset of pixels identified by the object detector 154 for a respective object instance. A region selected by the region of interest identification module 156 for an object instance may be referred to as an ROI for the object instance. An ROI for an object instance may be used to selectively identify respective pixels included in pixel data 153 and/or pixel data 143 for processing performed by resizing module 158 and/or localized depth map calculation module 160. Much as described in connection with object localization, an ROI may be specified as, for example, a rectangular bounding box or at a pixel-level. In some examples, the operations described for object detector 154 and region of interest identification module 156 may be performed together. For example, some machine-trained models jointly detect and localize object instances (whether as a rectangular bounding box or a more narrowly specified pixel level object segmentation). Accordingly, in some examples, an ROI for an object instance may directly correspond to the subset of pixels identified by the object detector 154 for the object instance.

In some implementations, an ROI selected for an object instance may be extended beyond the subset of pixels identified by the object detector 154 for the object instance, resulting in a larger region that encompasses more background pixels for the object instance. The amount of extension may be a predetermined amount of pixels, of a number of pixels in proportion to a dimension of the subset of pixels (for example, for a subset of pixels spanning X coordinates 200 through 299 (having a width of 100 pixels), and a proportion of five percent, a resulting ROI may be extended by five pixels in the left and right directions to span X coordinates 195 through 304). In some examples, the region of interest identification module 156 is configured to identify a second subset of pixels for an object instance that include a first subset of pixels identified by the object detector 154 and additional pixels immediately surrounding the first subset of pixels, and select an ROI corresponding to the second subset of pixels. By making the ROI slightly larger than the subset of pixels identified by object localization or segmentation, depth discontinuities around an object instance can be included in a localized depth map, so sufficient contrast can be determined between the object instance and background portions of the scene 110 in subsequent processing of the localized depth map. Additionally, an extended ROI may encompass foreground pixels for the object instance that were not identified by the object detector 154, allowing them to be included in downstream processing based on the extended ROI.

In some implementations, the depth map generator 150 may include a resizing module 158. The resizing module 158 is configured to determine a resizing amount or resizing amounts for resampling image data (which may be pixel data 153, pixel data 142, or intermediate depth estimate values) to generate a localized depth map for an ROI of the current frame 142 selected for an object instance. The resampling may also be referred to as "resizing" or "scaling," and the generated localized depth map may be referred to as a "resized depth map," "resampled depth map," or "scaled depth map." The resampling may include upsampling (in which a number of values in the X and/or Y directions is increased, such as for an increase in resolution) or downsampling (in which a number of values in the X and/or Y directions is decreased, such as for a decrease in resolution). The resized depth map helps to normalize the size of objects. For example, an object, such as a hand, occupies a larger field of view when it is close to the camera, and a smaller field of view when it is further away. In the resized depth map for the object, numbers of pixels showing the object and/or numbers of pixels in the localized depth map will be constant regardless of the object's distance from the camera. Such normalization is useful in providing a uniform amount of localized depth map data for downstream processing, which may allow simplifications in downstream processing techniques. Also, where downsampling occurs, an amount of localized depth map data for an object instance is reduced, reducing a computation load for downstream processing (such as processing by first depth map processing module 170). For example, such normalization reduces a number of parameters that a convolutional network must learn, and as a result can increase its performance in terms of quality and computational speed.

In some examples, a single resizing amount may be determined for resampling in both X and Y directions. In some examples, a first resizing amount may be determined for resampling in the X direction, and a second resizing amount may be determined for resampling in the Y direction. A resizing amount may also be referred to as a "scaling factor." A resizing amount may be determined based on a target depth map size, which may be specified as a total number of pixels, a width in the X direction, and/or a height in the Y direction. Different target depth map sizes may be specified, and consequently applied, for different object classes or groups of object classes. A target depth map size may be dynamically set or changed, such as by first depth map processing module 170. A resizing amount for an object instance may be determined based on a ratio between a target depth map size and a corresponding size of an ROI selected by the region of interest identification module 156. For example, based on a target depth map size specifying a total number of pixels, a resizing amount may be approximately a square root of the target depth map size divided by a number of pixels in the ROI. In some examples, a target depth map size may specify a maximum size for either the X or Y directions; for example, with a target depth map size of 128×128 pixels and an ROI of 256×128 pixels, a single resizing amount of 0.5 (128 divided by 256) may be applied in both the X and Y directions, resulting in downsampling of the ROI to a size of 128×64 pixels. In some examples, first and second target depth map sizes may be specified for the X and Y directions, and the ROI resampled in the X and Y directions to their respective target depth map sizes. For example, with a target depth map size of 128×128 pixels and an ROI of 256×160 pixels, an X direction resizing amount of 0.5 and a Y direction resizing amount of 0.8 may be applied, resulting in downsampling of the ROI to the target depth map size of 128×128 pixels. A localized depth map with a fixed size may be useful for certain downstream processing techniques. For example, some convolutional neural networks are configured to receive fixed size input data.

In some examples, the resizing module 158 may be configured to resample the pixel data (pixel data 153 or pixel data 142) for an object instance, and provide the resampled pixel data to the localizing depth map calculation module 160 to generate a localized depth map with a size corresponding to the resampled pixel data provided by the resizing module 158. A benefit of this providing resampled pixel data to the localizing depth map calculation module 160 is that a number of pixels processed by the localizing depth map calculation module 160 for an object instance will be approximately the same regardless of scene content (such as an FOV occupied by an object due to its distance from a camera). Such scene-independent runtime behavior is useful for ensuring predictable processing workloads for real-time processing requirements and/or reduced power processing.

In some examples, the resizing amount or amounts determined by the resizing module 158 for an object instance may be provided to the localized depth map calculation module 160 and applied by the localized depth map calculation module 160 to generate a localized depth map for the object instance. In such examples, this may involve localized depth map calculation module 160 calculating intermediate depth estimate values at a first resolution (for example, at the resolution of pixel data 142) for an ROI, and then resampling the intermediate depth estimate values by the resizing amount or amounts to generate a localized depth map for the object instance.

Much as suggested above, the localized depth map calculation module 160 is configured to selectively generate a localized depth map for each of the object instances identified for the current frame 142 (or the frame period for the current frame 142). A depth map may also be referred to as a "depth image." A localized depth map for an object instance is calculated within its respective ROI. By selectively limiting calculating depth estimates to the ROIs selected for the one or more object instances identified for the frame 142, an amount of depth estimate processing, and hardware resources and energy used for such processing, is substantially reduced over generating a depth map corresponding to all or most of an FOV of the frame 142. A remaining portion of the frame 142, outside of all of the ROIs selected for the one or more object instances identified for the frame 142, is not associated with a depth map generated for the current frame 142 (or for the frame period for frame 142). Depth estimation calculations are avoided for this remaining portion of the frame 142. In some examples, the remaining portion of the frame 142 includes at least 50% of the frame 142, representing a substantial amount of avoided depth estimation. In some examples, the remaining portion of the frame 142 includes at least 75% of the frame 142, representing a more substantial amount of avoided depth estimation. In some examples, the remaining portion of the frame 142 includes at least 90% of the frame 142, representing a yet more substantial amount of avoided depth estimation. Techniques for calculating depth estimates based on frame 142 and/or frame 146 for the frame period for the current frame 142 vary, based at least in part on a type of camera(s) that produce the frame(s). For example, different techniques are involved for processing light intensity data obtained via IR cameras, range-gated ToF cameras, phase-based ToF cameras, color cameras, and a pair of stereoscopic cameras.

In some examples, the localized depth map calculation module 160 calculates depth estimates for a localized depth map 164 for an object instance based on a portion of the pixel data 143 corresponding to the ROI selected for the object instance. In some examples in which pixel data 153 is different than pixel data 143, the localized depth map calculation module 160 calculates depth estimates for a localized depth map 164 for an object instance based on a portion of the pixel data 153 corresponding to the ROI selected for the object instance. In some examples, the localized depth map calculation module 160 calculates depth estimates for a localized depth map 164 for an object instance based on resampled pixel data received from resizing module 158. In any event, the localized depth map 164 is selectively generated for the frame period for the current frame 142 based at least in part on the current frame 142.

In some examples, the localized depth map calculation module 160 generates, for the current frame 142 (or the frame period for the frame 142), a localized depth map 164 (which may be referred to as "first localized depth map 164") corresponding to a first object instance detected in pixel data 153 and a second localized depth map 166 corresponding to a second object instance detected in pixel data 153 (and generated as described above). In the example illustrated in FIG. 1, the first localized depth map 164 is provided to a first depth map processing module 170 and the second localized depth map 166 is provided to a second depth map processing module 172. Details about delivery and downstream processing of localized depth maps generated by the depth map generator 150 are described below.

In implementations in which system 100 includes the second camera 130, and the first and second cameras 120 and 130 are arranged for stereoscopic depth estimation (for example, the first camera 120 may be a "left" camera and the second camera 130 may be a "right" camera), the frame 146 (including pixel data 147 included therein) may be processed in much the same manner described above for frame 142, with current frames 142 and 146 both for the same frame period or overlapping frame periods, object instances detected in pixel data 147 of frame 146 (or preprocessed pixel data for frame 146 similar to pixel data 153) by the object detector 154, and respective ROIs of the second frame 146 selected for the detected object instances. In some examples, the localized depth map generator 150 is configured to correlate object instances for frame 142 with object instances for frame 146. A first ROI in the first frame 142 and a second ROI in the second frame 146 for a single object or object instance define bounds for portions of the first and second frames 142 and 146 that are selectively searched as part of a stereo matching process for generating a localized depth map for the single object or object instance corresponding to the first and second ROIs for a current frame period.

In some examples in which first and second cameras 120 and 130 are of different types (for example, where the first camera 120 is a color camera, and the second camera 130 is a ToF camera), the first frame 142 produced by the first camera 120 may be processed, as described above, by the object detector 154 to detect and localize object instances for the current frame period based on pixel data for the first frame 142. Respective ROIs of the second frame 146, corresponding to the detected object instances and respective subsets of pixels, may be selected by the region of interest selection module 156. Then, pixel data for the second frame 146 from the selected ROIs may be used to generate localized depth maps, much as discussed above. An advantage for such examples may be that object detection, localization, and/or segmentation techniques may be more mature or effective for the frames 140 produced by the first camera 120, but more accurate and/or precise depth estimates may be calculated using the frames 144 produced by the second camera 130. In some examples, pixel data for ROIs of the second frame 146 may be automatically retained (for example, in response to a high confidence score for an object class) for use in training one or more machine-training models for object detection, localization, and/or segmentation using light intensity values obtained via cameras of the same type as the second camera 130. This allows a corpus of training examples to be accumulated for one camera type by using an established machine-trained model (or other object detection technique) for another camera type. For example, a large body of techniques and models have been, and continue to be, developed and improved for RGB color images. In some examples in which first and second cameras 120 and 130 are of different types, object detector 154 uses both the first and second frames 142 and 146 for object detection, localization, and/or segmentation, taking advantage of an additional spectrum range, additional color components, or other additional information obtained via the second camera 130 over the first camera 120.

The first depth map processing module 170 receives the localized depth map 164 for an object instance detected for current frame 142 (or for the current frame period). The first depth map processing module 170 analyzes the localized depth map 164 to generate information about the object instance corresponding to the localized depth map 164. The first depth map processing module 170 may be implemented in whole or in part with program instructions executed by one or more processors. By way of non-limiting examples, the first depth map processing module 170 may be configured to perform hand tracking (for example, for gesture-based input and interaction with system 100), skeleton tracking (for example, for pose recognition), and more refined object recognition (for example, object recognition for a specific object class, and/or object segmentation utilizing depth information). In some examples, data generated by the object detector 154 in the course of object detection, localization, and/or segmentation performed for the object instance may be also provided to the first depth map processing module 170, allowing the first depth map processing module 170 to take advantage of processing already performed by the object detector 154.

In some examples, depth map processing modules, such as depth map processing modules 170 and 172, may register themselves, or otherwise be registered, as being associated with one or more object classes and/or groups of object classes, and receive localized depth maps from localized depth map generator 150 for those object classes. For example, the first depth map processing module 170 may be registered to receive hand-related localized depth maps, and the first depth map processing module 170 may be registered to receive vehicle-related localized depth maps. In some examples, first depth map processing module 170 may be configured to set and/or modify target depth map sizes for resizing module 158.

In some examples, the localized depth map generator 150 may be configured to provide an additional localized depth map to first depth map processing module 170 for an ROI requested by the first depth map processing module 170. For example, the first depth map processing module 170 may be configured to determine that a downsampled localized depth map 164 lacks sufficient detail, and in response to that determination request a full resolution depth map 164 for all of the ROI corresponding to localized depth map 164, a portion of the ROI, or another region identified by first depth map processing module 170. In some examples, the additional localized depth map may be requested with a specified target depth map size. This allows the first depth map processing module 170 to obtain additional data in an event where localized depth map 164 is determined to be insufficient or incomplete.

The above description of the first depth map processing module 170 applies to the second depth map processing module 172. As noted above, FIG. 1 illustrates the second depth map processing module 172 receiving a second localized depth map 166. In some examples, as illustrated in FIG. 1, the second depth map processing module 172 is configured to process the second localized depth map 166 to generate events and/or data that is processed by an application software 174 executing on the system 100. In an example in which the system 100 includes or is communicatively coupled to a display device 180, the application program 174 may be configured to display and/or change one or more user interface elements via the display device 180 in response to the events and/or data provided by the second depth map processing module 172. It is noted that although two depth map processing modules 170 and 172 are illustrated in FIG. 1, the system 100 may include one or more depth map processing modules configured to process localized depth maps generated by the localized depth map generator 150. It is noted that although one application program 174 is illustrated in FIG. 1, system 100 may include zero or more application programs configured to respond to events and/or data generated by the above-mentioned depth map processing modules.

In the embodiments that follow in FIGS. 2-10, the reader may understand that the various features, properties, characteristics, configurations, and/or arrangements as described above with reference to FIG. 1 may be equally applicable to the following embodiments. Thus, for example, although a device or system included therein may not be specifically described below as including a feature, property, characteristic, configuration and/or arrangement, it may be appreciated that the details provided above with respect to FIG. 1 may be incorporated in any of the following embodiments of FIGS. 2-10. Additionally, it may be appreciated that additional details provided in FIGS. 2-10 may be incorporated into the embodiments of FIG. 1.

Figure 2:
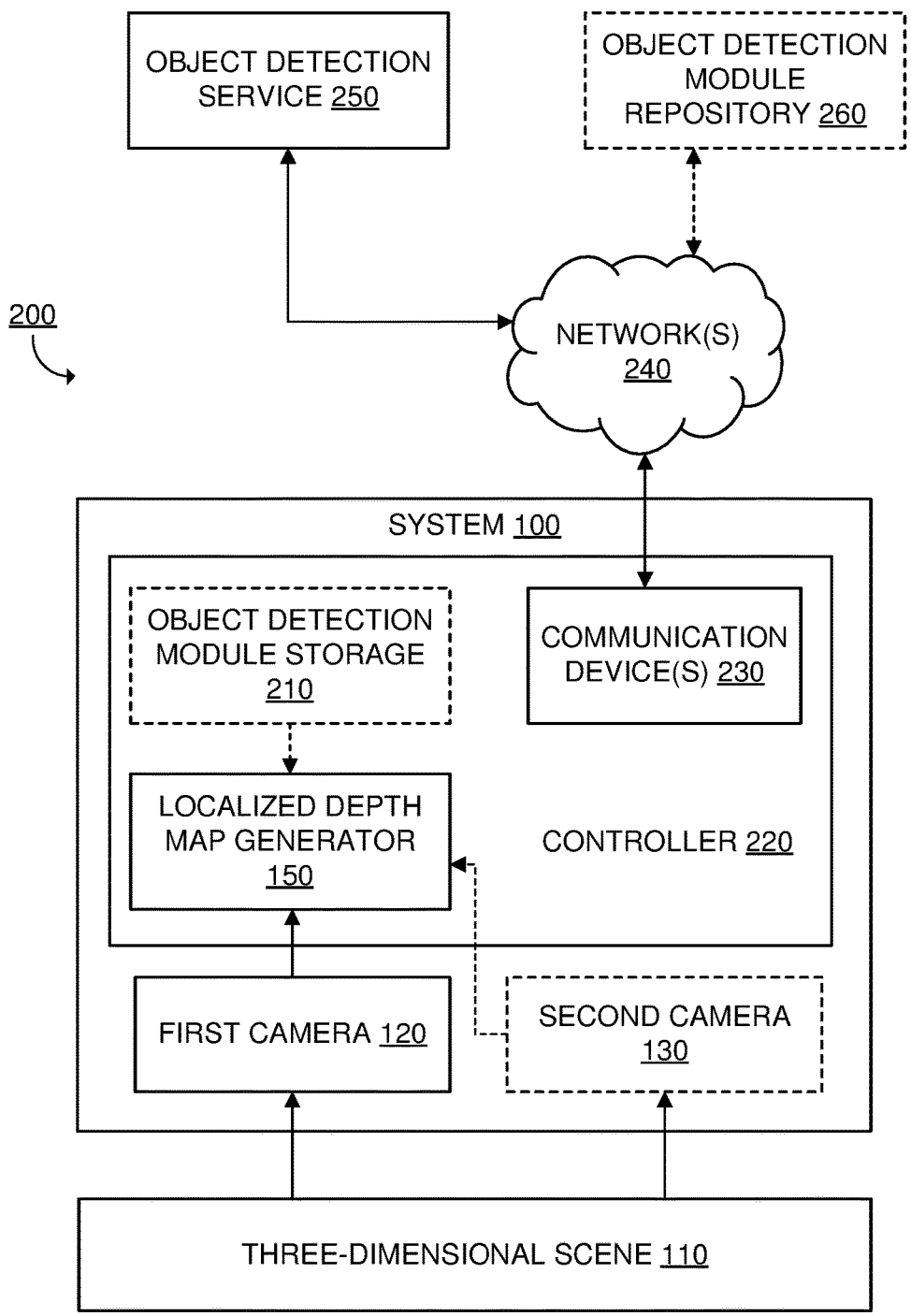
FIG. 2 illustrates an example of a system in which the system illustrated in FIG. 1 is configured to interact with a remote object detection service via one or more network(s).

FIG. 2 illustrates an example of a system 200 in which the system 100 illustrated in FIG. 1 is configured to interact with a remote object detection service 250 via one or more network(s) 240. In this example, the system 100 includes a controller 220 including, among other things, localized depth map generator 150. The localized depth map generator 150 may be implemented by hardware included in the controller 220. The controller 220 may include one or more processors configured to execute program instructions causing the controller 220 to perform operations for the localized depth map generator 150, and one or more communication device(s) 230 configured to allow system 100 to communicate with object detection service 250 via network(s) 240. Such communication may be performed via, for example, Wi-Fi, cellular data communications, and/or Bluetooth. Network(s) 240 includes one or more data communication networks allowing data to be communicated between system 100 and object detection service 250. Network(s) 240 may include, for example, the Internet, an internet service provider (ISP) connection, a local wired or wireless network (such as, but not limited to, Wi-Fi or Ethernet), a short range wireless network (such as, but not limited to, Bluetooth), and/or an internal network connecting other computing systems with object detection service 250.

In the example illustrated in FIG. 2, the system 100 is configured to, in some circumstances, submit pixel data, such as a portion of pixel data 153, to the object detection service 250. The object detection service 250 is configured to, much as described for object detector 154 in FIG. 1, perform object detection, localization, and/or segmentation of one or more object instances detected in the pixel data received from system 100. Advantages offered by the object detection service 250 over the object detector 154 include, but are not limited to, the object detection service 250 offering significantly greater processing capability (particularly where system 100 is a battery powered device), the object detection service 250 applying more sophisticated techniques for object detection, localization, and/or segmentation, and/or the object detection service 250 being capable of identifying a larger number of object classes (for example, the object detection service 250 may be configured to identify less frequently encountered object classes). As object detection service 250 has significantly higher latency than the object detector 154 included in the system 100, it not invoked by the system 100 for purposes of real-time object detection, localization, and/or segmentation. In contrast, the object detector 154 is configured to allow real-time object detection, localization, and/or segmentation using the resources provided by the system 100.

In some examples, the localized depth map generator 150 is configured to use one or more object detection modules stored in an object detection module storage 210 for object detection, localization, and/or segmentation. An object detection module may include program instructions, data, and or a machine-trained model for one or more object classes. In some examples, the system 100 is configured to dynamically add, replace, modify, remove, enable, and/or disable object detection modules stored by the object detection module storage 210. An advantage of using object detection module storage 210 is the ability to dynamically change the object detection capabilities of the system 100. In some examples, a depth map processing module, such as the first depth map processing module 170 in FIG. 1, may provide one or more object detection modules. In some examples, the system 200 may include a remote object detection module repository 260. The remote object detection module repository 260 is configured to store and provide object detection modules requested by the system 100. The system 100 may be configured to request, via network(s) 240, one or more object detection modules from the object detection module repository 260. In some examples, in response to the object detection service 250 detecting an object instance for an object class that the system 100 is not currently configured to detect, the system 100 may retrieve an object detection module for the detected object class from the object detection module repository 260. An advantage for such examples is that they allow the object detector 154 to be dynamically updated to support a previously unrecognized object class in response to another system (object recognition service 250, in this example) determining that the system 100 has encountered an instance of the object class. In some examples, the system 100 may be configured to identify and obtain updated object detection modules from the object detection module repository 260.

In the embodiments that follow in FIGS. 3A-10, the reader may understand that the various features, properties, characteristics, configurations, and/or arrangements as described above with reference to FIG. 2 may be equally applicable to the following embodiments. Thus, for example, although a device or system included therein may not be specifically described below as including a feature, property, characteristic, configuration and/or arrangement, it may be appreciated that the details provided above with respect to FIG. 2 may be incorporated in any of the following embodiments of FIGS. 3A-10. Additionally, it may be appreciated that additional details provided in FIGS. 3A-10 may be incorporated into the embodiments of FIG. 2.

Figure 3A:
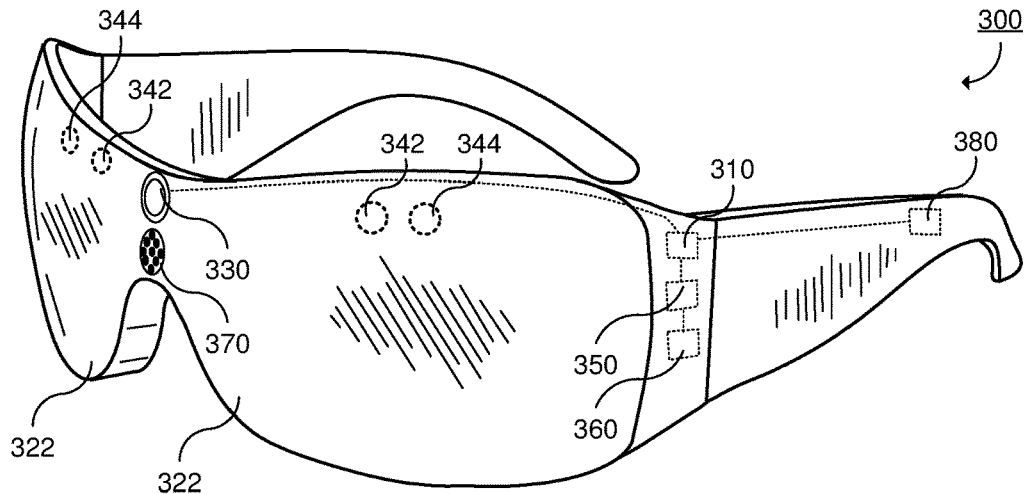
FIG. 3A illustrates an example of a mobile head-mounted device configured to incorporate the techniques described herein.
Figure 3B:
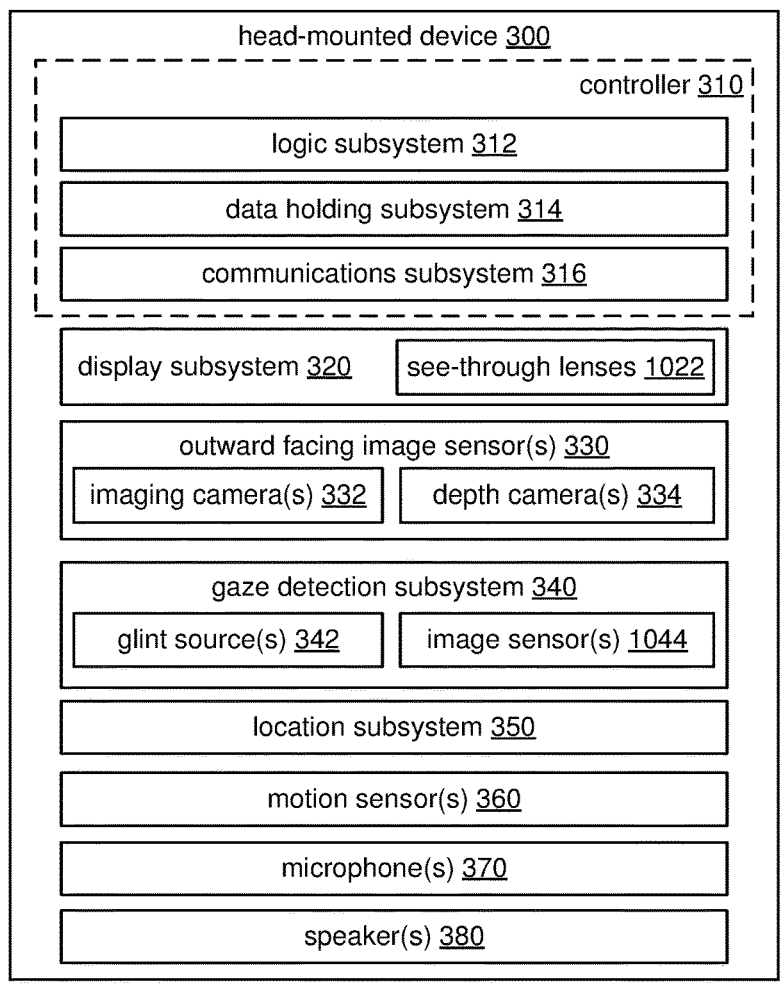
FIG. 3B illustrates a block diagram of the head-mounted device illustrated in FIG. 3A.

FIG. 3A illustrates an example of a mobile head-mounted device 300 configured to incorporate the techniques described herein. FIG. 3B illustrates a block diagram of the head-mounted device 300 illustrated in FIG. 3A. In the example illustrated in FIGS. 3A and 3B, the head-mounted device 300 is intended to be worn on a user's head during ordinary use and includes a head mounted display (HMD) device. Embodiments may be useful for virtual reality (VR), augmented reality (AR), and/or mixed reality (MR) applications. It is noted that this disclosure is expressly not limited to head-mounted devices, and techniques described herein may be used with other types of devices, including, but not limited to, smartphone devices, tablet computers, notebook computers, and devices or systems including heads up displays that are configured to provide VR, AR, or MR capabilities. Mixed reality refers to an experience allowing virtual imagery to be mixed with a real-world physical environment in a display. For example, real-world objects and/or real-world spaces may be identified and augmented with corresponding virtual objects. Mixed reality may be implemented with, for example, virtual reality or augmented reality technologies. The techniques described herein may also be applied to other sensing applications that process sensed 3-D depth information, such as automotive or vehicular sensors, object scanning sensors, security cameras or devices, and sensors placed on UAVs (unmanned air vehicles) or other aerial vehicles.

The head-mounted device 300 includes a display subsystem 320 for displaying images to a user of the head-mounted device 300. Except where conflicting with the below discussion, the descriptions of the display 180 in FIG. 1 apply to the display subsystem 320. In the example illustrated in FIG. 3A, the display subsystem 320 is intended to be close to a user's eyes and includes a see-through HMD device including one or more transparent or semi-transparent see-through lenses 322 arranged such that images may be projected onto the see-through lenses 322, or produced by image-producing elements (for example, see-through OLED displays) located within the see-through lenses 322. A user wearing the head-mounted device 300 has an actual direct view of a real-world space (instead of image representations of the real-world space) through the see-through lenses 322, and at the same time view virtual objects (which may be referred to as virtual images or holograms) that augment the user's direct view of the real-world space. It is noted that this disclosure is expressly not limited to devices using see-through display devices. In some implementations, the display subsystem 320 may be non-transparent and not allow, in all, substantially all, or part of a user's field of view, the user to directly view a scene through the display subsystem 320. Such implementations include, but are not limited to, AR devices arranged to display visual images of a physical space in front of the head-mounted device 300 with virtual objects added to augment the display of the physical space, and VR devices arranged to display virtual objects at positions corresponding to those of real-world objects in a physical space in front of the head-mounted device 300. In some implementations, the head-mounted device 300 may be embodied in a handheld mobile device arranged to display augmentations on a display device such as an LCD panel. In such implementations, the handheld mobile device may be arranged to provide a "window" in with virtual augmentations may be displayed for a scene around the head-mounted device 300.

The head-mounted device 300 further includes one or more outward facing image sensors 330 configured to acquire image data for a real-world scene around and/or in front of the head-mounted device 300. Except where conflicting with the below discussion, the descriptions of the first camera 120 and the second camera 130 in FIG. 1 apply to the outward facing image sensors 330. The outward facing image sensors 330 may include one or more digital imaging camera(s) 332 arranged to capture two-dimensional visual images. In some implementations, two imaging camera(s) 332 may be used to capture stereoscopic images. The outward facing imaging sensors 330 may also include one or more depth camera(s) 334, such as, but not limited to, time of flight depth cameras, arranged to capture depth-related image data, which may be used to generate one or more depth maps providing estimated and/or measured distances from the head-mounted device 300 to various portions of a field of view (FOV) of the depth camera(s) 334. Depth-related image data obtained via the depth camera(s) 334 may be registered to other image data, such as images concurrently captured via imaging camera(s) 332. Some or all of the outward facing image sensors 330 may be configured to capture individual images and/or sequences of images (for example, at a configurable frame rate or frames rates).

The head-mounted device 300 may further include a gaze detection subsystem 340 configured to detect, or provide sensor data for detecting, a direction of gaze of each eye of a user, as illustrated in FIGS. 3A and 3B. The gaze detection subsystem 340 may be arranged to determine gaze directions of each of a user's eyes in any suitable manner. For example, in the example illustrated in FIGS. 3A and 3B, the gaze detection subsystem 330 includes one or more glint sources 332, such as infrared light sources, arranged to cause a glint of light to reflect from each eyeball of a user, and one or more image sensor(s) 334 arranged to capture an image of each eyeball of the user. Changes in the glints from the user's eyeballs as determined from image data gathered via image sensor(s) 334 may be used to determine a direction of gaze. Further, a location at which gaze lines projected from the user's eyes intersect the external display may be used to determine an object or position at which the user is gazing (for example, a virtual object displayed by the display subsystem 320). The gaze detection subsystem 340 may have any suitable number and arrangement of glint sources and image sensors. In one non-limiting example embodiment, four glint sources and one image sensor are used for each eye.

The head-mounted device 300 may also include a location subsystem 350 arranged to provide a location of the head-mounted device 300. Location subsystem 350 may be arranged to determine a current location based on signals received from a navigation satellite system, such as, but not limited to, GPS (United States), GLONASS (Russia), Galileo (Europe), and CNSS (China), and technologies augmenting such signals, such as, but not limited to, augmented GPS (A-GPS). The location subsystem 350 may be arranged to determine a location based on radio frequency (RF) signals identifying transmitting devices and locations determined for such devices. By way of example, Wi-Fi, Bluetooth, Zigbee, RFID, NFC, and cellular communications include device identifiers that may be used for location determination. Head-mounted device 300 may be arranged to use a location provided by the location subsystem 350 as an approximate location, which is refined based on data collected by other sensors. As described in FIG. 1, operation of the object detector 154 may be affected by a determined location (for example, adjusting one or more threshold scores for one or more object classes). The head-mounted device 300 may include audio hardware, including one or more microphones 370 arranged to detect sounds, such as verbal commands from a user of the head-mounted device 300, and/or one or more speaker(s) 380 arranged to output sounds to the user, such as verbal queries, responses, instructions, and/or information.

The head-mounted device 300 may include one or more motion sensor(s) 360 arranged to measure and report motion of the head-mounted device 300 as motion data. In some implementations, the motion sensor(s) 360 may include an inertial measurement unit (IMU) including accelerometers (such as a 3-axis accelerometer), gyroscopes (such as a 3-axis gyroscope), and/or magnetometers (such as a 3-axis magnetometer). The head-mounted device 300 may be arranged to use this motion data to determine changes in position and/or orientation of head-mounted device 300, and/or respective changes in position and/or orientation of physical objects in a scene relative to the head-mounted device 300. The outward facing image sensor(s) 330, image sensor(s) 344, sensors included in the location subsystem 350, motion sensor(s) 360, and microphone(s) 370, which are included in or are coupled to the head-mounted device 300, may be, individually or collectively, referred to as head mounted sensors. Data collected via such head mounted sensors reflect the position and orientations of a user's head.

The head-mounted device 300 further includes a controller 310 including a logic subsystem 312, a data holding subsystem 314, and a communications subsystem 316. The logic subsystem 312 may include, for example, one or more processors configured to execute instructions and communicate with the other elements of the head-mounted device 300 illustrated in FIGS. 3A and 3B according to such instructions to realize various aspects of this disclosure. Such aspects include, but are not limited to, configuring and controlling devices, processing sensor input, communicating with other computer systems, and/or displaying virtual objects via display subsystem 320. The data holding subsystem 314 includes one or more memory devices (such as, but not limited to, DRAM devices) and/or one or more storage devices (such as, but not limited to, flash memory devices). The data holding subsystem 314 includes one or more media having instructions stored thereon which are executable by the logic subsystem 312, which cause the logic subsystem 312 to realize various aspects of this disclosure. Such instructions may be included as part of an operating system, application programs, or other executable programs. Features described above for localized depth map generator 150, first depth map processing module 170, second depth map processing module 172, and/or application software 174 may be implemented in whole or in part by controller 310, and their above descriptions apply to controller 310. A portion of the data holding subsystem 314 may be used as described for object detection module storage 210. The communications subsystem 316 is arranged to allow the head-mounted device 300 to communicate with other computer systems. Such communication may be performed via, for example, Wi-Fi, cellular data communications, and/or Bluetooth. The descriptions of the communication device(s) 230 in FIG. 2 apply to the communications subsystem 316.

It will be appreciated that the head-mounted device 300 is provided by way of example, and thus is not meant to be limiting. Therefore, it is to be understood that the head-mounted device 300 may include additional and/or alternative sensors, cameras, microphones, input devices, output devices, etc. than those shown without departing from the scope of this disclosure. Further, the physical configuration of a head-mounted device and its various sensors and subcomponents may take a variety of different forms without departing from the scope of this disclosure.

Figure 4:
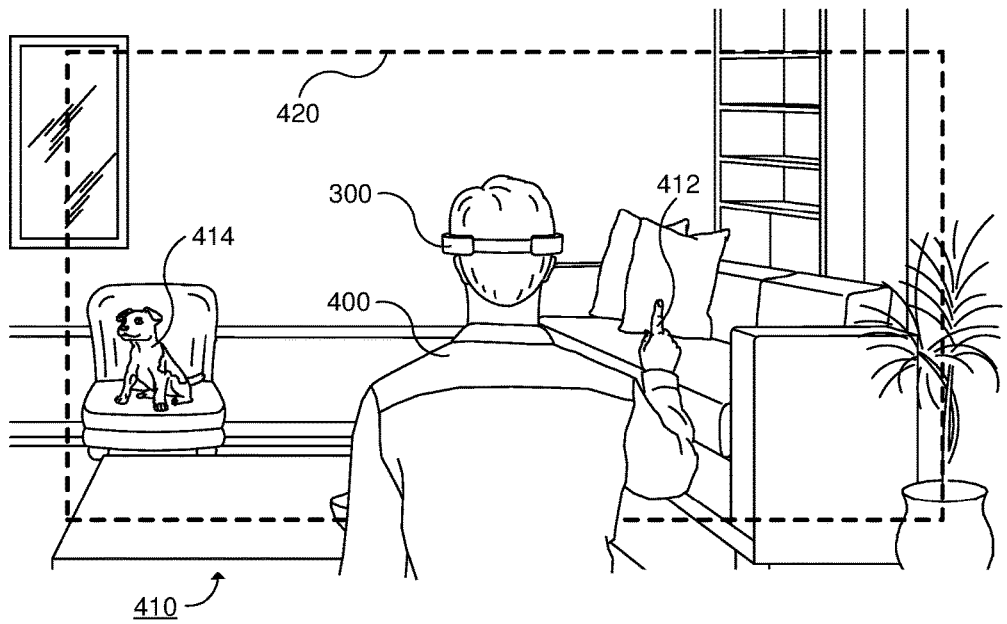
FIG. 4 illustrates an example of an end user wearing and using the head-mounted device illustrated in FIGS. 3A and 3B in a three-dimensional scene.
Figure 5:
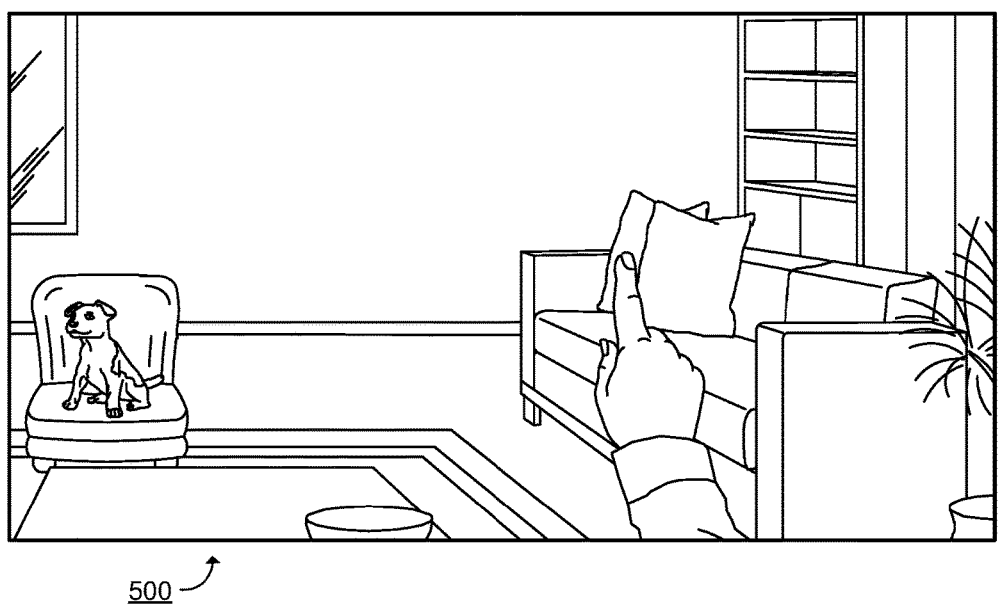
FIG. 5 shows an illustrative example of a frame produced for the frame period illustrated in FIG. 4.

FIG. 4 illustrates an example of an end user 400 wearing and using the head-mounted device 300 illustrated in FIGS. 3A and 3B in a three-dimensional scene 410. Except where conflicting with the below discussion, the descriptions in FIGS. 1-3B apply to the features illustrated in FIG. 4. In this example, the scene 410 is a room in a living unit, such as a house or apartment. The scene 410 includes, among other things, a first physical object 412 (the end user's right hand) and a second physical object 414 (a dog). FIG. 4 illustrates a state of the scene 410 for a frame period during which amounts of light received from the scene 410 within an FOV 420 of a camera included in the head-mounted device 300 are measured by the camera to produce a frame, much as previously described for producing frame 142 in FIG. 1. During the frame period illustrated in FIG. 4, the end user 400 is holding up his right hand, such that it is visible in the FOV of the camera. FIG. 5 shows an illustrative example of a frame 500 produced for the frame period illustrated in FIG. 4. The FOV for the frame 500 corresponds to the FOV 420 illustrated in FIG. 4. The pixel data for the frame 500 includes light intensity values for amounts of light received from the first and second physical objects 412 and 414 during the frame period for the frame 500.

Figure 6:
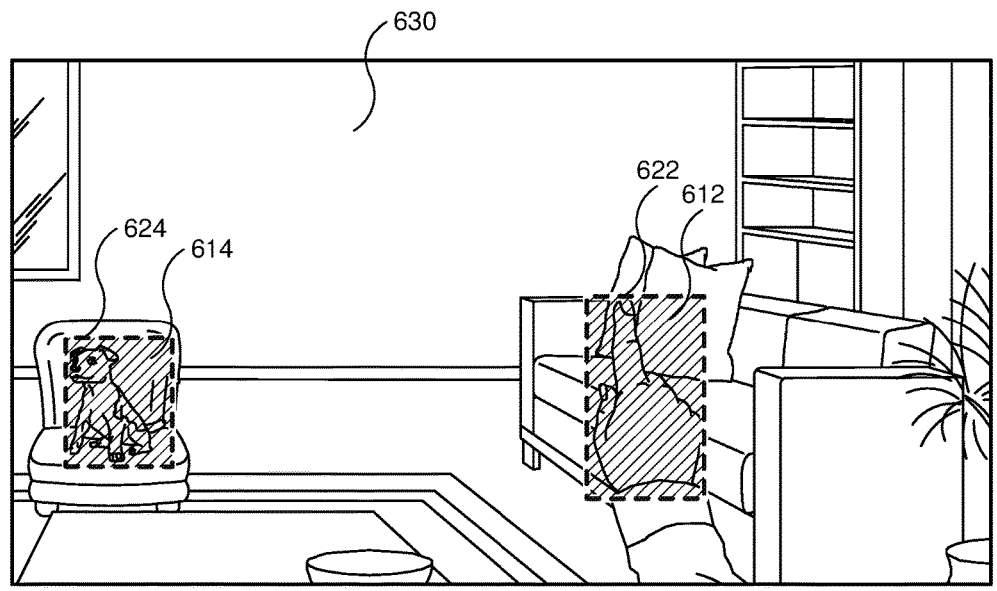
FIG. 6 illustrates an example of object localizations performed for the frame 500 illustrated in FIG. 5.

FIG. 6 illustrates an example of object localizations performed for the frame 500 illustrated in FIG. 5. The object localizations may be performed much as described in FIG. 1 for the frame 142, including the various operations described for frame preprocessing module 152 and the object detection module 154. A first subset 612 of pixels for the frame 500 has been identified as being associated with a first object instance associated with the first physical object 412. A second subset 614 of the pixels for the frame 500 has been identified as being associated with a second object instance associated with the second physical object 414. In some examples, the first and second object instances are included in different object classes (for example, a "hand" object class and a "dog" object class). The first and second subsets 612 and 614 each closely surround the pixels for the frame 500 that include light intensity values for amounts of light received from their respective physical objects 412 and 414. The first and second subsets 612 and 614 are each specified by respective rectangular bounding boxes 622 and 624. In an example in which ROIs of the frame 500 for the first and second object instances are the same as the bounding boxes 622 and 624, a first localized depth map is selectively generated within the first bounding box 622, and a second localized depth map is selectively generated within the second bounding box 624, much as FIG. 1 describes generation of the first and second localized depth maps 164 and 166. The remaining portion 630 of the frame 500 outside of the bounding boxes 622 and 624 is not associated with a depth map generated for the frame 500 (or the frame period for the frame 500).

Figure 7:
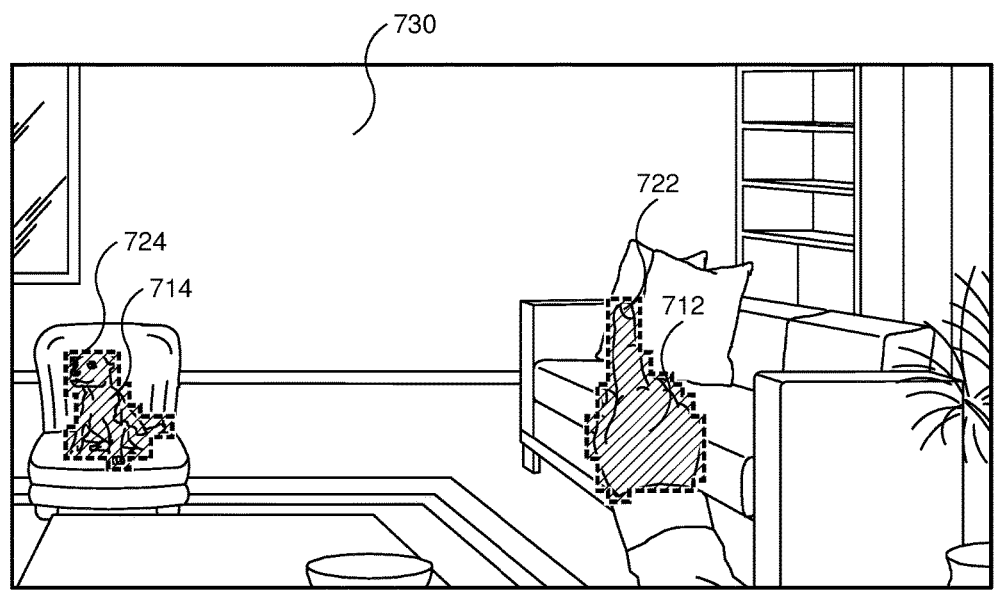
FIG. 7 illustrates an example of object segmentations performed for the frame illustrated in FIG. 5.

FIG. 7 illustrates an example of object segmentations performed for the frame 500 illustrated in FIG. 5. Except where conflicting with the below discussion, the description of FIG. 6 applies to the corresponding features illustrated in FIG. 7. The object segmentations may be performed much as described in FIG. 1 for the frame 142, including the various operations described for frame preprocessing module 152 and the object detection module 154. A first subset 712 of pixels for the frame 500 has been identified as being associated with a first object instance associated with the first physical object 412. A second subset 714 of the pixels for the frame 500 has been identified as being associated with a second object instance associated with the second physical object 414. The object segmentations provide pixel-level labeling for the first and second object instances, resulting in the first and second subsets 712 and 714 not including background pixels that are included in the first and second subsets 612 and 614 in FIG. 6. In an example in which ROIs of the frame 500 for the first and second object instances are the same as the boundaries 722 and 724, a first localized depth map is selectively generated within the first boundary 722, and a second localized depth map is selectively generated within the second boundary 724, much as described in FIG. 6. The remaining portion 730 of the frame 500 outside of the boundaries 722 and 724 is not associated with a depth map generated for the frame 500 (or the frame period for the frame 500).

Figure 8:
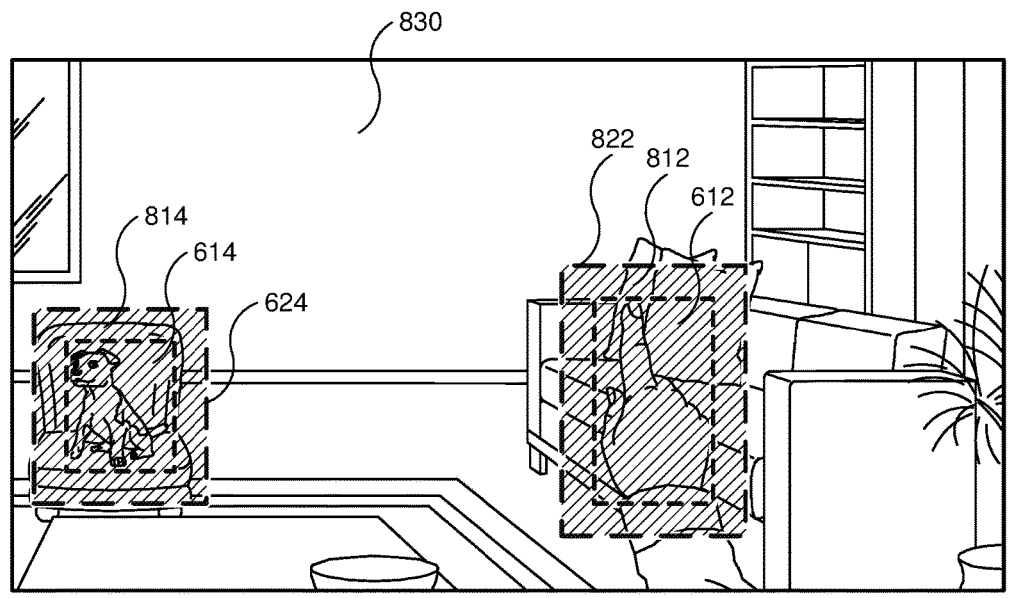
FIG. 8 illustrates an example of expanded regions of interest being selected for the object localizations illustrated in FIG. 6.

FIG. 8 illustrates an example of expanded regions of interest being selected for the object localizations illustrated in FIG. 6. As described in FIG. 1 for the region of interest selection module 156, an ROI selected for an object instance may be extended beyond the subset of pixels identified by the object detector 154 for the object instance, resulting in a larger region that encompasses more background pixels for the object instance. In the example illustrated in FIG. 8, a first expanded ROI 812 of the frame 500, corresponding to the first subset 612 of pixels, is selected by expanding beyond the first subset 612 of pixels by the same number of pixels in the X and Y directions, resulting in the first expanded ROI 812 having a rectangular first bounding box 822. The additional region in which the first expanded ROI 812 extends beyond the first subset 612 of pixels may be referred to as a "halo." A second expanded ROI 814 of the frame 500, corresponding to the second subset 614 of pixels, is selected by a similar expansion beyond the second subset 614 of pixels, resulting in the second expanded ROI 814 having a rectangular second bounding box 824. A first localized depth map is selectively generated within the first expanded ROI 812 for the first object instance, and a second localized depth map is selectively generated within the second expanded ROI 814 for the second object instance, much as FIG. 1 describes generation of the first and second localized depth maps 164 and 166.

Figure 9:
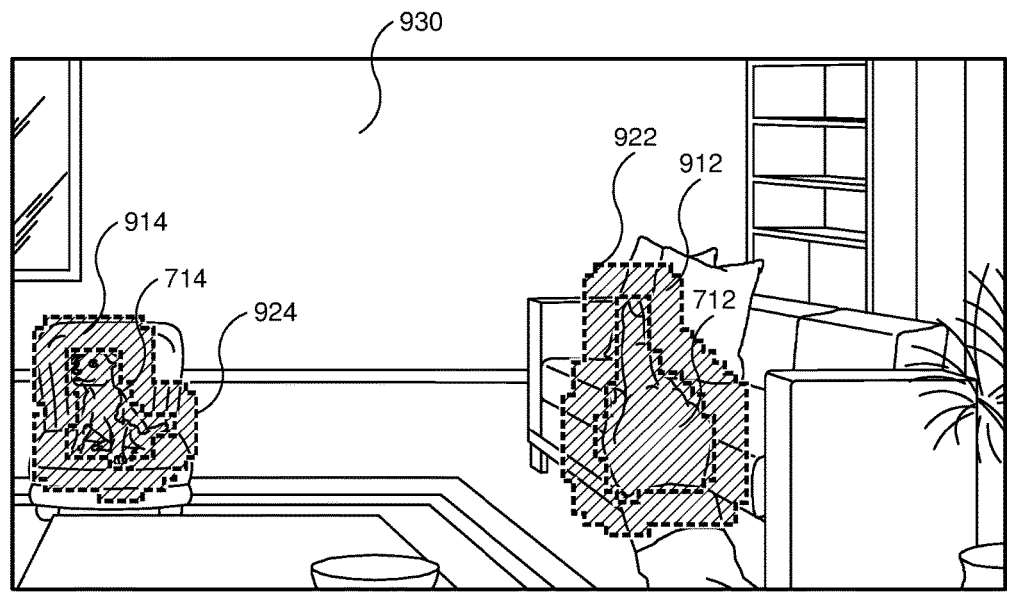
FIG. 9 illustrates an example of expanded regions of interest being selected for the object segmentations illustrated in FIG. 7.

FIG. 9 illustrates an example of expanded regions of interest being selected for the object segmentations illustrated in FIG. 7. Except where conflicting with the below discussion, the description of FIG. 8 applies to the corresponding features illustrated in FIG. 9. In this example, a first expanded ROI 912 of the frame 500, corresponding to the first subset 712 of pixels, is selected by expanding the first subset 712 of pixels outward by a fixed distance, resulting in the first expanded ROI 912 having an irregular first boundary 922. In some examples, instead of an irregular boundary, a rectangular bounding box may be selected around the first subset 712 of pixels, which would result in the first ROI 912 being much the same as the ROI 812 in FIG. 8. A second expanded ROI 914 of the frame 500, corresponding to the second subset 714 of pixels, is selected by a similar outward expansion from the second subset 714 of pixels, resulting in the second expanded ROI 914 having an irregular first boundary 924. A first localized depth map is selectively generated within the first expanded ROI 912 for the first object instance, and a second localized depth map is selectively generated within the second expanded ROI 914 for the second object instance, much as described in FIG. 8.

Figure 10:
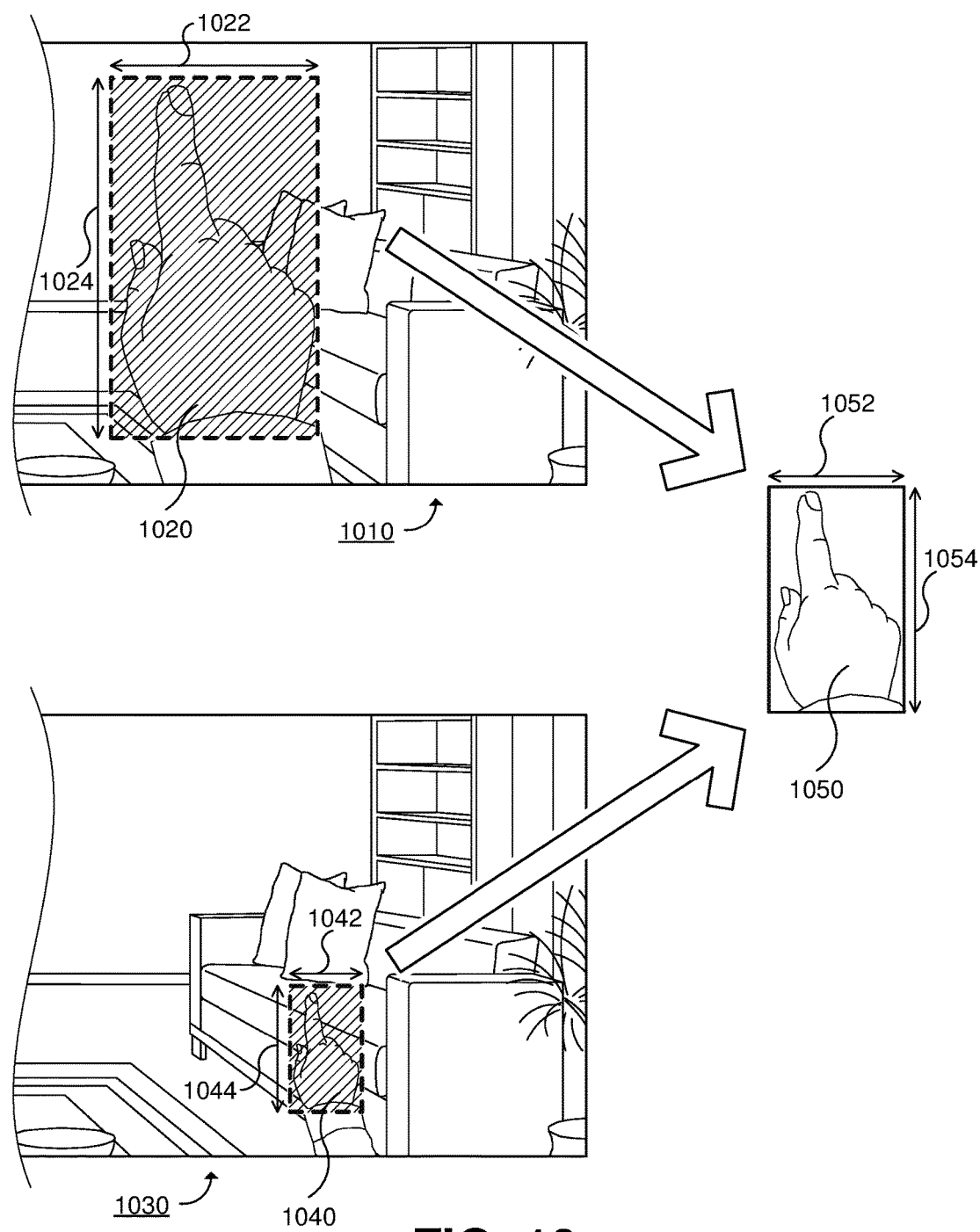
FIG. 10 illustrates examples of downsampling and upsampling image data to generate localized depth maps.

FIG. 10 illustrates examples of downsampling and upsampling image data to generate localized depth maps. For example, as described for resizing module 158 in FIG. 1, pixel data for an object instance (such as pixel data 153 or pixel data 142 illustrated in FIG. 1) may be resampled. FIG. 10 illustrates a first frame 1010, for a different frame period than for the frame 500 shown in FIGS. 5-9, during which the first physical object 412 is closer to the camera, and accordingly is larger in frame 1010 than in frame 500. In this example, a rectangular ROI 1020 of the first frame 1010 has been selected for the first physical object 412, and has a width 1022 and a height 1024. An example of a localized depth map 1050 is illustrated, with a first target depth map size 1052 (which may be referred to as a "target width" for localized depth map 1050) and a second target depth map size 1054 (which may be referred to as a "target height" for localized depth map 1050). For the first frame 1010, resize amounts are determined for the X and Y directions, and the determined resize amounts are used for downsampling to generate the localized depth map 1050 with the target width 1052 and the target height 1054, much as described in FIG. 1 in connection with the resizing module 158.

FIG. 10 also illustrates a second frame 1030, for a different frame period than for the frame 500 shown in FIGS. 5-9 or for the first frame 1010, during which the first physical object 412 is farther from the camera, and accordingly is smaller in frame 1030 than in frame 500. In this example, a rectangular ROI 1040 of the second frame 1030 has been selected for the first physical object 412, and has a width 1042 and a height 1044. For the second frame 1030, resize amounts are determined for the X and Y directions, and the determined resize amounts are used for upsampling to generate the localized depth map 1050 with the target width 1052 and the target height 1054. Thus, regardless of an original size of an ROI, whether larger or smaller than a target depth map size, a localized depth map can be consistently generated according to the target depth map size.

Figure 11:
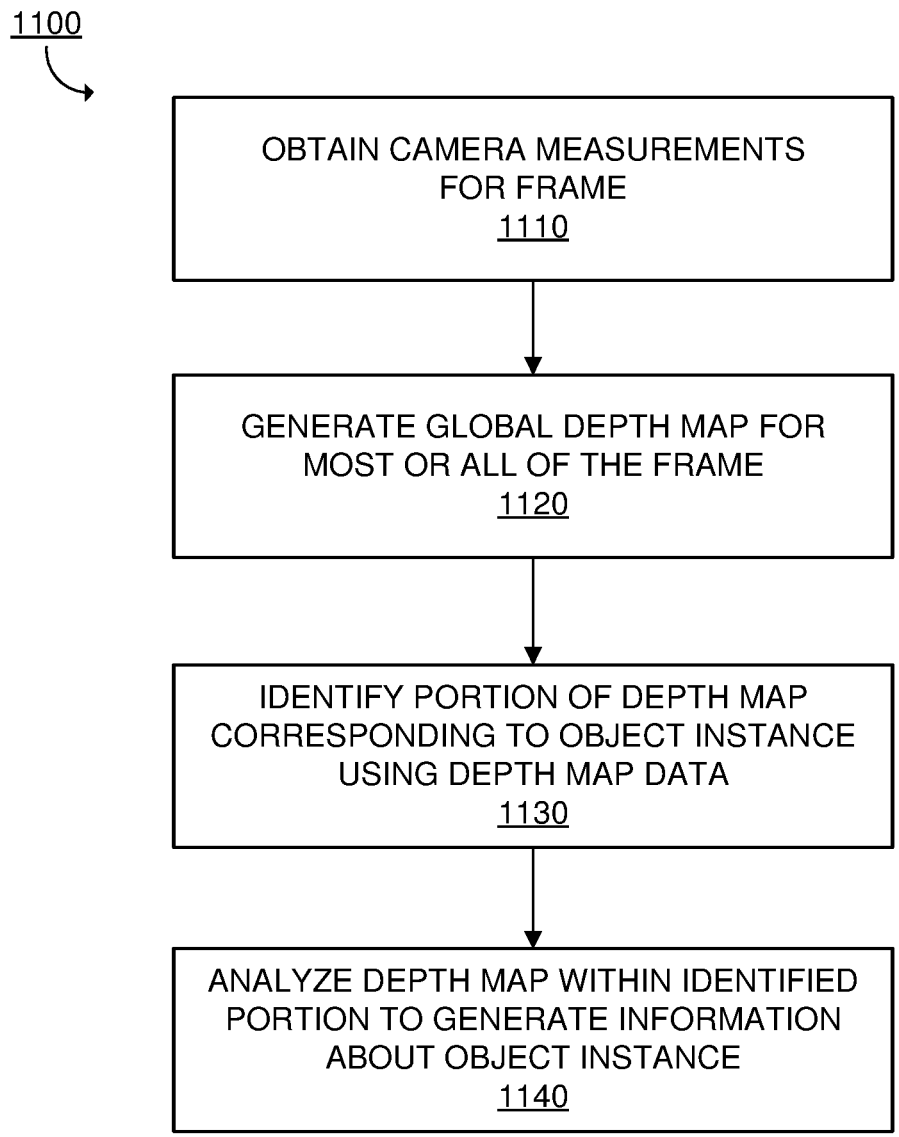
FIG. 11 illustrates an example of a conventional process for object instance detection and analysis, which does not employ the techniques described in FIGS. 1-10.

FIG. 11 illustrates an example of a conventional process 1100 for object instance detection and analysis, which does not employ the techniques described in FIGS. 1-10. At a first step 1110, camera measurements are obtained by a camera to produce a frame, much as frame 142 is produced by the first camera 120 in FIG. 1. At a second step 1120, a global depth map corresponding to most or all of the frame produced at step 1110, which involves generating a substantial number of depth estimate values for the frame. In some examples, a reduced resolution depth map may be generated to reduce amounts of processing performed in later steps, but the reduced resolution depth map still corresponds to most or all of the frame. At a third step 1130, a portion of the global depth map generated at step 1120 is identified as corresponding to an object instance detected in the global depth map based on the global depth map data. In some examples, foreground and background pixels may be separated based on changes in depth values. At a fourth step 1140, a more detailed analysis of the global depth map within the portion identified at step 1130 to generate information about the object instance. In contrast to this process 1100 shown in FIG. 11, the techniques described in FIGS. 1-10 avoid calculating depth estimate values, which can be an expensive operation, for most of a frame by generating localized depth maps for identified object instances instead of the global depth map generated at step 1120 of the process 1100. Benefits of this approach include a substantial reduction in power, latency, and processing cycles for depth calculations, while continuing to generate depth map data for objects of interest.

Figure 12:
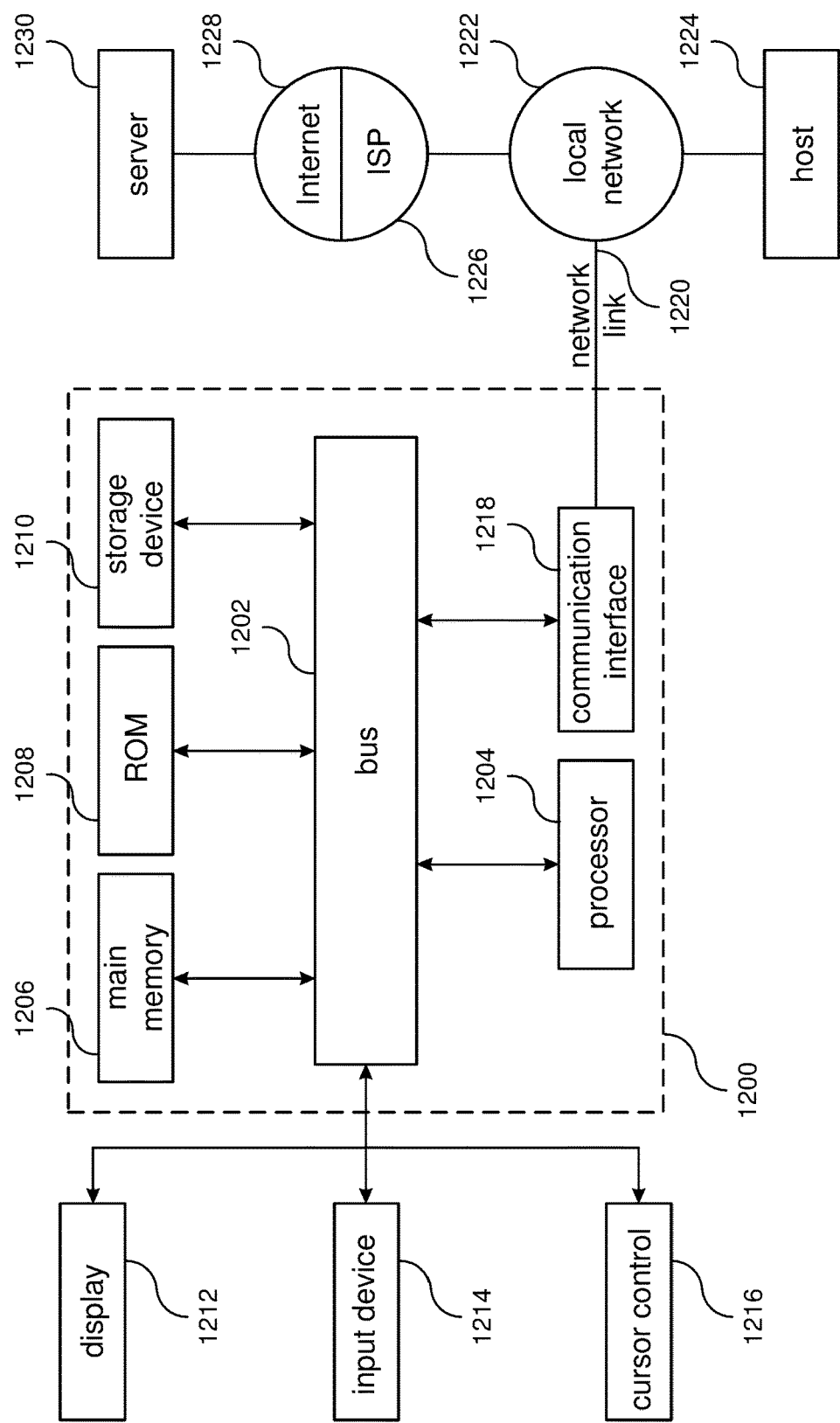
FIG. 12 illustrates a block diagram showing an example computer system upon which aspects of this disclosure may be implemented.

FIG. 12 illustrates a block diagram showing an example computer system 1200 upon which aspects of this disclosure may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. The computer system 1200 can implement, for example, one or more of, or portions of system 100, system 200, object detection service 250, object detection module repository 260, and/or head-mounted device 300.

Computer system 1200 can further include a read only memory (ROM) 1208 or other static storage device coupled to bus 1202 for storing static information and instructions for processor 1204. A storage device 1210, such as a flash or other non-volatile memory can be coupled to bus 1202 for storing information and instructions.

Computer system 1200 may be coupled via bus 1202 to a display 1212, such as a liquid crystal display (LCD), for displaying information. One or more user input devices, such as the example user input device 1214 can be coupled to bus 1202, and can be configured for receiving various user inputs, such as user command selections and communicating these to processor 1204, or to a main memory 1206. The user input device 1214 can include physical structure, or virtual implementation, or both, providing user input modes or options, for controlling, for example, a cursor, visible to a user through display 1212 or through other techniques, and such modes or operations can include, for example virtual mouse, trackball, or cursor direction keys.

The computer system 1200 can include respective resources of processor 1204 executing, in an overlapping or interleaved manner, respective program instructions. Instructions may be read into main memory 1206 from another machine-readable medium, such as storage device 1210. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media can include, for example, optical or magnetic disks, such as storage device 1210. Transmission media can include optical paths, or electrical or acoustic signal propagation paths, and can include acoustic or light waves, such as those generated during radio-wave and infra-red data communications, that are capable of carrying instructions detectable by a physical mechanism for input to a machine.

Computer system 1200 can also include a communication interface 1218 coupled to bus 1202, for two-way data communication coupling to a network link 1220 connected to a local network 1222. Network link 1220 can provide data communication through one or more networks to other data devices. For example, network link 1220 may provide a connection through local network 1222 to a host computer 1224 or to data equipment operated by an Internet Service Provider (ISP) 1226 to access through the Internet 1228 a server 1230, for example, to obtain code for an application program.

Figure 13:
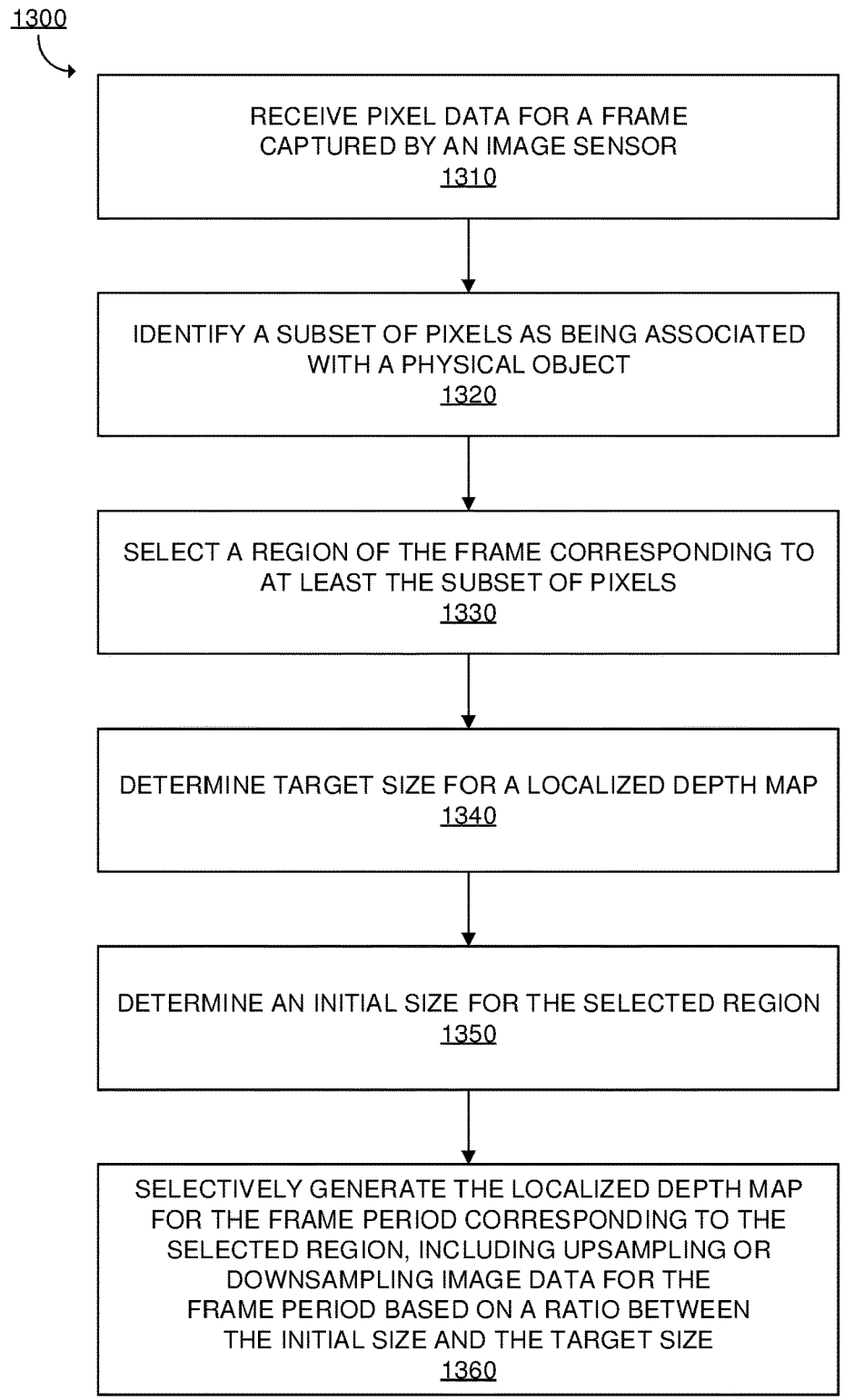
FIG. 13 illustrates an example process of localized depth map generation consistent with the techniques described in FIGS. 1-10.

FIG. 13 illustrates an example process 1300 of localized depth map generation consistent with the techniques described in FIGS. 1-10. At 1310, the process 1300 begins with receiving pixel data for a frame captured by an image sensor. In some examples, the pixel data includes at least one light intensity value, corresponding to an amount of light received by the image sensor during a frame period, for each of a plurality of pixels. At 1320, the process 1300 continues with identifying a subset of the pixels as being associated with a physical object detected based on at least the pixel data. At 1330, the process 1300 continues with selecting a region of the frame, the region corresponding to at least the subset of the pixels identified as being associated with the physical object. A portion of the first frame outside of the region is not associated with a depth map generated for the frame period. At 1340, the process 1300 continues with determining a target size for a localized depth map. At 1350, the process 1300 continues with determining an initial size for the region. At 1360, the process 1300 continues with selectively generating a localized depth map for the frame period corresponding to the selected region. In some examples, the generation of the localized depth map includes upsampling or downsampling image data for the frame period based on a ratio between the initial size and the target size.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A device employing depth sensing, the device comprising:
   a first image sensor configured to measure received amounts of light;
   an object detector configured to:
      receive first pixel data for a first frame captured by the first image sensor, the first pixel data including at least one light intensity value, corresponding to an amount of light received by the first image sensor during a first frame period, for each of a plurality of first pixels, and
      identify a first subset of the first pixels as being associated with a first physical object detected based on at least the first pixel data;
   a region of interest selection module configured to select a first region of the first frame, the first region corresponding to at least the first subset of the first pixels identified by the object detector; and a depth map calculation module configured to selectively generate a localized depth map for the first frame period corresponding to the first region selected by the region of interest selection module, wherein:
a portion of the first frame outside of the first region is not associated with a depth map generated for the first frame period;
the device further comprises a localized depth map generator:
including the depth map calculation module,
including a resizing module configured to determine a target size for the localized depth map and determine an initial size for the first region, and
configured to upsample or downsample image data for the first frame period based on a ratio between the initial size and the target size; and
the depth map calculation module is configured to generate the localized depth map based on at least the upsampled or downsampled image data.

2. The device according to claim 1, wherein the depth map calculation module is configured to generate the localized depth map based on at least second pixel data for the first frame captured by the first image sensor, the second pixel data including at least one light intensity value, corresponding to an amount of light received by the first image sensor during the first frame period, for each of a plurality of second pixels.

3. The device according to claim 1, further comprising a second image sensor configured to measure received amounts of light, wherein
the second image sensor is included in a different camera than the first image sensor, and
the depth map calculation module is configured to:
receive second pixel data for a second frame captured by the second image sensor, the second pixel data including at least one light intensity value, corresponding to an amount of light received by the second image sensor during a second frame period overlapping the first frame period, for each of a plurality of second pixels, and
generate the localized depth map based on at least the received second pixel data.

4. The device according to claim 1, wherein:
the first image sensor is a time-of-flight imaging sensor;
the device is configured to determine at least one active brightness value for each of the plurality of first pixels;
the object detector is configured to identify the first subset of the first pixels based on the determined active brightness values; and
the device is configured to perform phase calculation or dealiasing depth calculation for the first subset of the first pixels after the identification of the first subset of the first pixels.

5. The device according to claim 1, wherein the image data is second pixel data for the first frame captured by the first image sensor, the second pixel data including at least one light intensity value, corresponding to an amount of light received by the first image sensor during the first frame period, for each of a plurality of second pixels.

6. The device according to claim 1, further comprising a depth map processing module configured to receive the localized depth generated by the depth map calculation module configured to process the localized depth map to generate events and/or data,
wherein the resizing module is configured to receive the target size from the depth map processing module.

7. The device according to claim 1, wherein:
the region of interest selection module is configured to identify a second subset of the first pixels, which includes the first subset of the first pixels and a plurality of the first pixels immediately surrounding the first subset of the first pixels; and
the first region corresponds to the second subset of the first pixels.

8. The device according to claim 1, further comprising:
a head-mounted display arranged to be worn and viewed by an end user of the device;
a controller including one or more processors;
one or more machine readable media storing instructions which, when executed by the one or more processors, cause the controller to:
process the localized depth map to generate events and/or data, and
display and/or change one or more user interface elements via the head-mounted display in response to the events and/or data.

9. The device according to claim 1, wherein:
the localized depth map generator is configured to downsample image data for the first frame period based on the ratio between the initial size and the target size; and
the depth map calculation module is configured to generate the localized depth map based on at least the downsampled image data.

10. A device employing depth sensing, the device comprising:
a first image sensor and a second image sensor arranged for stereoscopic depth estimation and each configured to measure received amounts of light;
an object detector configured to:
receive first pixel data for a first frame captured by the first image sensor, the first pixel data including at least one light intensity value, corresponding to an amount of light received by the first image sensor during a first frame period, for each of a plurality of first pixels,
identify a first subset of the first pixels as being associated with a first physical object detected based on at least the first pixel data,
receive second pixel data for a second frame captured by the second image sensor, the second pixel data including at least one light intensity value, corresponding to an amount of light received by the second image sensor during a second frame period overlapping the first frame period, for each of a plurality of second pixels, and
identify a second subset of the second pixels as being associated with the first physical object detected based on at least the second pixel data;
a region of interest selection module configured to:
select a first region of the first frame, the first region corresponding to at least the first subset of the first pixels identified by the object detector, and
select a second region of the second frame, the second region corresponding to at least the second subset of the second pixels identified by the object detector; and
a depth map calculation module configured to perform stereo matching of pixels selected as corresponding to the first region of the first frame and pixels selected as corresponding to the second region of the second frame to generate a localized depth map corresponding to the first and second regions selected by the region of interest selection module, wherein:

a portion of the first frame outside of the first region is not associated with a depth map generated for the first frame period, and a portion of the second frame outside of the second region is not associated with a depth map generated for the first or second frame periods;

the device further comprises a localized depth map generator:
including the depth map calculation module,
including a resizing module configured to determine a target size for the localized depth map and determine an initial size for the first region, and
configured to upsample or downsample image data for the first frame period based on a ratio between the initial size and the target size; and
the depth map calculation module is configured to generate the localized depth map based on at least the upsampled or downsampled image data.

11. A method of localized depth map generation, the method comprising:
receiving first pixel data for a first frame captured by a first image sensor, the first pixel data including at least one light intensity value, corresponding to an amount of light received by the first image sensor during a first frame period, for each of a plurality of first pixels;
identifying a first subset of the first pixels as being associated with a first physical object detected based on at least the first pixel data;
selecting a first region of the first frame, the first region corresponding to at least the first subset of the first pixels identified as being associated with the first physical object;
selectively generating a localized depth map for the first frame period corresponding to the selected first region;
determining a target size for the localized depth map; and
determining an initial size for the first region, wherein:
a portion of the first frame outside of the first region is not associated with a depth map generated for the first frame period, and
the generating the localized depth map includes upsampling or downsampling image data for the first frame period based on a ratio between the initial size and the target size.

12. The method of claim 11, wherein the localized depth map is generated based on at least second pixel data for the first frame captured by the first image sensor, the second pixel data including at least one light intensity value, corresponding to an amount of light received by the first image sensor during the first frame period, for each of a plurality of second pixels.

13. The method of claim 11, further comprising:
receiving second pixel data for a second frame captured by a second image sensor included in a different camera than the first image sensor, the second pixel data including at least one light intensity value, corresponding to an amount of light received by the second image sensor during a second frame period overlapping the first frame period, for each of a plurality of second pixels,
wherein the localized depth map is generated based on at least the second pixel data.

14. The method of claim 13, wherein:
the first image sensor is a color image sensor; and
the first pixel data includes multiple light intensity values, corresponding to amounts of light received for respective color components by the first image sensor during the first frame period, for each of the plurality of first pixels.

15. The method of claim 11, wherein:
the first image sensor is a time-of-flight imaging sensor;
the method further comprises determining at least one active brightness value for each of the plurality of first pixels;
the identifying the first subset of the first pixels is based on the determined active brightness values; and
the identifying the first subset of the first pixels is performed prior to phase calculation or dealiasing depth calculation for the first subset of the first pixels.

16. The method of claim 11, wherein the image data is second pixel data for the first frame captured by the first image sensor, the second pixel data including at least one light intensity value, corresponding to an amount of light received by the first image sensor during the first frame period, for each of a plurality of second pixels.

17. The method of claim 11, further comprising:
providing the localized depth map to a depth map processing module; and
receiving the target size from the depth map processing module.

18. The method of claim 11, wherein the first physical object is a human hand.

19. The method of claim 11, further comprising:
identifying a second subset of the first pixels, which includes the first subset of the first pixels and a plurality of the first pixels immediately surrounding the first subset of the first pixels, wherein
the first region corresponds to the second subset of the first pixels.

20. The method of claim 11, wherein the generating the localized depth map includes downsampling image data for the first frame period based on the ratio between the initial size and the target size.

* * * * *